United States Patent
Lekakis et al.

(10) Patent No.: US 11,397,750 B1
(45) Date of Patent: Jul. 26, 2022

(54) AUTOMATED CONFLICT RESOLUTION AND SYNCHRONIZATION OF OBJECTS

(71) Applicant: Amazon Technologies, Inc., Seattle, WA (US)

(72) Inventors: Vasileios Lekakis, Seattle, WA (US); Richard Threlkeld, Seattle, WA (US); Ashwin Devendran, Seattle, WA (US); Nathan Robert Quinn, Seattle, WA (US); Shih-Hsuan Yuan, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 274 days.

(21) Appl. No.: 16/698,930

(22) Filed: Nov. 27, 2019

(51) Int. Cl.
*G06F 16/00* (2019.01)
*G06F 16/27* (2019.01)
*G06F 16/21* (2019.01)
*G06F 16/23* (2019.01)

(52) U.S. Cl.
CPC .......... *G06F 16/275* (2019.01); *G06F 16/219* (2019.01); *G06F 16/2365* (2019.01); *G06F 16/2379* (2019.01)

(58) Field of Classification Search
CPC .... G06F 16/273; G06F 16/275; G06F 16/219; G06F 16/2365; G06F 16/2379
See application file for complete search history.

(56) References Cited

U.S. PATENT DOCUMENTS

| | | | |
|---|---|---|---|
| 2008/0120129 A1* | 5/2008 | Seubert | G06Q 40/125 705/305 |
| 2010/0088676 A1* | 4/2010 | Yuan | G06F 16/80 707/E17.005 |
| 2014/0095432 A1* | 4/2014 | Trumbull | G06F 16/213 707/610 |
| 2014/0250360 A1* | 9/2014 | Jiang | G06F 40/197 715/229 |
| 2015/0012488 A1* | 1/2015 | van Rossum | G06Q 10/101 707/611 |
| 2015/0120763 A1* | 4/2015 | Grue | G06F 16/24 707/754 |
| 2016/0092526 A1* | 3/2016 | Kothari | G06F 16/13 707/602 |
| 2016/0246837 A1* | 8/2016 | Wikman | H04L 67/1095 |
| 2017/0052676 A1* | 2/2017 | Pulier | G06F 3/04883 |
| 2017/0083292 A1* | 3/2017 | McLaughlan | G06F 3/0484 |

(Continued)

*Primary Examiner* — Noosha Arjomandi
(74) *Attorney, Agent, or Firm* — Lee & Hayes, P.C.

(57) ABSTRACT

A centralized datastore maintained by a service provider may maintain current versions of objects (e.g., applications, documents, websites, etc.). A local datastore residing on user devices of users may maintain local versions of the objects. A user may submit a modification to the object and, upon determining that a version of the local object is the same as the version of current version of the object, a current version of the object may be updated to include the modification. If the version and the current version are different, individual fields of the object may be analyzed to determine if the modification involves a change to data that conflicts with data within the same field in the current version of the object. If not, the objects may be merged and the current version of the object may be updated to include the modification. Otherwise, the modification will be rejected.

20 Claims, 11 Drawing Sheets

(56) References Cited

U.S. PATENT DOCUMENTS

| | | | |
|---|---|---|---|
| 2017/0185573 A1* | 6/2017 | Milvaney | G06F 16/24578 |
| 2017/0220814 A1* | 8/2017 | Pathak | G06F 21/105 |
| 2017/0285896 A1* | 10/2017 | Chandra | G06F 3/1454 |
| 2017/0300552 A1* | 10/2017 | Mandadi | G06F 16/273 |
| 2019/0108274 A1* | 4/2019 | DaBoll-Lavoie | G06F 16/3338 |
| 2021/0311480 A1* | 10/2021 | Yang | G05D 1/0221 |

* cited by examiner

AUTOMATED CONFLICT RESOLUTION AND SYNCHRONIZATION OF OBJECTS

BACKGROUND

Service providers offer cloud-based services to fulfill users' computing-service needs without the users having to invest in and maintain computing infrastructure required to implement the services. These service providers may maintain networks of managed computing resources and functionality to implement various types of on-demand services, such as storage services, compute-power services, database-management services, networking services, and so forth. In this way, service providers maintain service provider networks that provide customers with on-demand delivery of compute power, database storage, applications, and other resources, rather than the customers having to make upfront investments in hardware and spend time and resources managing the hardware.

Users (e.g., developers, customers, etc.) may utilize a service provider network to create, access, and/or modify various types of objects or documents, such as word-processing documents, spreadsheets, mobile and/or web applications, web-based documents (e.g., websites, blogs, etc.). Via the service provider network, multiple users may have access to the same documents at the same time. As a result, at least two different users may make different modifications to the same document, resulting in a conflict between the two versions of the document. This may cause the version of the document stored by the service provider network to include some, but not all, of the modifications made by users, which may result in this version of the document to be out-of-date. User modifications that are not accounted for may result in the loss of that data. In addition, certain users may access a current version of a document stored by the service provider network and then make modifications to that version of the document while in an offline state (e.g., not connected to a network, such as the Internet). While in this offline state, any modifications to the document will not be synchronized with the version of the document stored by the service provider network. While the user is offline, other users may make modifications to the version of the document stored by the service provider network. When the user again connects to a network via his/her device, the version of the document stored on his/her device may be different than the version stored by the service provider network, possibly resulting in a conflict between the two versions. Again, this may result in data loss and may prevent a user from making modifications to a current version of a document while in an offline state.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

DETAILED DESCRIPTION

Figure 1:
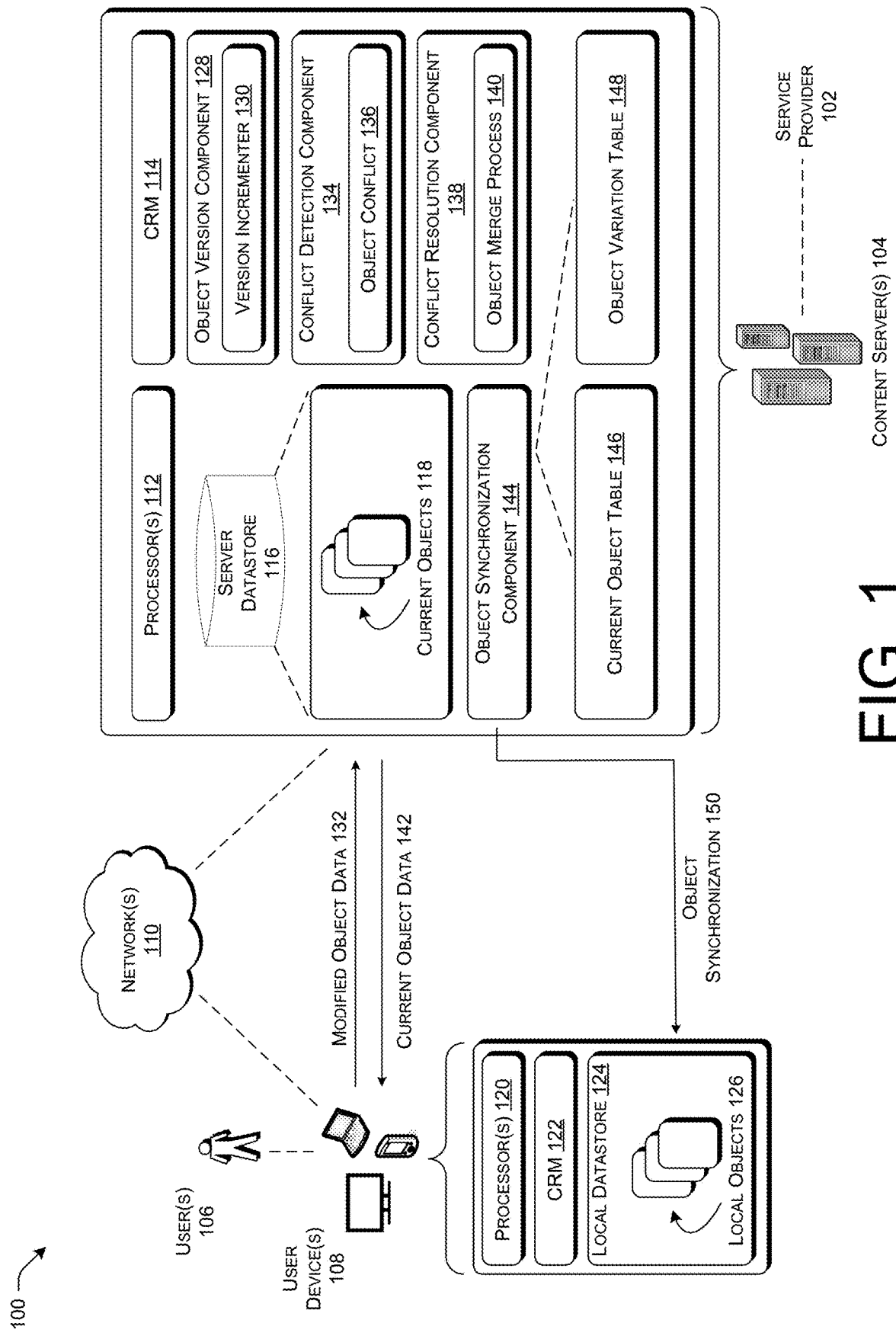
FIG. 1 is a schematic diagram of an illustrative environment that includes a service provider that is configured to resolve conflicts between different versions of an object and synchronize a local datastore of a user device with a centralized datastore maintained by one or more servers.

This disclosure is directed to systems and/or processes for detecting and resolving conflicts between different versions of the same object, as well as synchronizing a local datastore of objects at a user device with a centralized datastore of objects maintained by one or more servers. In particular, a service provider or a service provider network may maintain a datastore or database (collectively referred to herein as "datastore") of objects or documents, where the datastore maintains the most current version of the objects/documents (collectively referred to herein as "objects"). Since the objects are accessible by multiple users via corresponding user devices, multiple users may simultaneously access and modify the same version of the same object. For instance, a first user that is currently connected to the network may modify a current version of the object stored on his/her user device. Upon making that modification, the service provider may synchronize a local datastore at the user device of the first user such that the current version of the object maintained by the service provider includes the user modification. However, a second user may have also modified the current version of the object either simultaneously with the first user, or while the second user was in an offline state (e.g., not connected to the network). As a result, any modifications made to the object by the second user may be inconsistent and in conflict with the current version of the object maintained by the service provider.

Accordingly, the service provider may maintain a centralized datastore that includes the current version of various objects. Users may send queries to the service provider to access and receive the current version of the objects, where the received objects may be stored locally in local datastores of user devices. Upon a user making a modification or mutation to an object, the modified object may be sent to the service provider. The service provider may perform a conflict detection process to determine whether the modified object received from the user device is in conflict with the current version of that same object maintained in the centralized datastore. In particular, the service provider may compare a version of the object maintained in the centralized datastore with a version of the received modified object. If the version of the modified object is different than (e.g., less than) the version of the object maintained by the service provider, the service provider may reject the modification and provide a corresponding modification failure notification to the user.

However, despite the object versions being different and potentially in conflict, the service provider may further analyze whether a conflict occurs between individual fields of the modified object and the current version of the object. For instance, provided that the modified object included a modification to data within a field that is not inconsistent with the corresponding data of the current version of the object (e.g., non-conflicting fields), the service provider may merge the modified object and the current object to generate an updated object that includes the modification associated with the modified object. The manner in which the objects and fields are merged may be based on a type (e.g., a scalar value/integer, a list, a set, etc.) of the field. In various embodiments, provided that the two objects are merged, the service provider may increment the version of the current object to reflect the modified data. That is, if the current object had a version of "2" and the modified object had a version of "1", the version of the current object may be incremented by one, resulting in a version of "3". Further, in some instances the service provider may update the current object if the modification to the modified object relates to an addition of data to a field. That is, the current object and the modified object may be merged if the modified object adds data to a field that is not inconsistent or in conflict with data included in the same field in the current object. For instance, provided that the current object included a list of data, the modified object may include additional data not included in the list of data. Provided that the additional data is not inconsistent with the list of data, the current object may be updated with the additional data and the version of the current object may be incremented. However, if the data included in the field of the modified object conflicts with data in the same field of the current object (e.g., a conflicting field), the service provider may reject the modification associated with the modified object.

In addition to identifying conflicts between different versions of objects and resolving such conflicts, the service provider may synchronize local datastores of user devices with the centralized datastore maintained by the service provider. The centralized datastore may maintain the most current version of objects, which are accessible by various users. Each user device of a user may maintain a local datastore that also maintains the current versions of the objects. However, the local datastore of a user device may not be synchronized with the centralized datastore if a current version of an object was modified at the centralized datastore, or if the user device was offline and not connected to a network for a period of time. In such a scenario, the service provider may synchronize the local datastores such that they maintain current versions of the objects. In particular, the service provider may synchronize the local datastores of user devices using a current object table that maintains, or at least lists or identifies, current versions of the objects and an object variation table that identifies modifications to objects (and times associated with the modifications). In some instances, the object variation table may identify modifications to objects since user devices were synchronized with the centralized datastore, thereby allowing only the most recent modifications of objects to be provided to the local datastores of user devices. In some instances, once an object maintained in a local datastore has been updated, the service provider may cause a previous version of the object to be deleted from the local datastores.

It should be appreciated that the subject matter presented herein may be implemented as a computer process, a computer-controlled apparatus, a computing system, or an article of manufacture, such as a computer-readable storage medium. While the subject matter described herein is presented in the general context of program modules that execute on one or more computing devices, those skilled in the art will recognize that other implementations may be performed in combination with other types of program modules. Generally, program modules include routines, programs, components, data structures and other types of structures that perform particular tasks or implement particular abstract data types.

Those skilled in the art will also appreciate that aspects of the subject matter described herein may be practiced on or in conjunction with other computer system configurations beyond those described herein, including multiprocessor systems, microprocessor-based or programmable consumer electronics, minicomputers, mainframe computers, handheld computers, personal digital assistants, e-readers, mobile telephone devices, tablet computing devices, special-purposed hardware devices, network appliances and the like. As mentioned briefly above, the examples described herein may be practiced in distributed computing environments, where tasks may be performed by remote computing devices that are linked through a communications network. In a distributed computing environment, program modules may be located in both local and remote memory storage devices.

In the following detailed description, references are made to the accompanying drawings that form a part hereof, and that show, by way of illustration, specific examples or examples. The drawings herein are not drawn to scale. Like numerals represent like elements throughout the several figures (which may be referred to herein as a "FIG." or "FIGS.").

FIG. 1 is a schematic diagram of an illustrative environment 100 that includes a service provider 102 and one or more content servers 104 associated with the service provider that are configured to detect conflicts between different versions of objects, resolve such conflicts, and synchronize local datastores of user devices with a centralized datastore maintained by the service provider 102 and stored by the content server(s) 104. The environment 100 further includes one or more users 106, user devices 108 associated with the users 106, and one or more networks 110, which may facilitate communications, and/or the exchange or transmission of data, between the content server(s) 104 and the customer devices 108.

For the purpose of this discussion, the service provider 102 and/or the content server(s) 104 may be any number of servers, an entity, a platform, a service provider, a service provider network, etc., that facilitates the access and modification of objects, which may include any type of document, data, or information that can be accessed and modified by the users 106 via corresponding user devices 108. The objects may include word-processing documents, spreadsheets, mobile and/or web-based applications, web-based documents (e.g., websites, blogs, etc.), and so on. The service provider 102 may maintain a website, platform, database, etc. that is accessible by the users 106 via the user devices 108. In some embodiments, the service provider 102 may offer various network-based (or "cloud-based") services to the customers 106 to fulfill computing needs of the customers 106. In some embodiments, the service provider 102 may operate service provider networks that include clusters of managed servers (or other hardware-based computing devices) stored in data centers located across different geographic regions. Users 106 of the service provider 102 can request that the service provider 102 allocate computing resources in these data centers to support computing workloads and/or can request the objects maintained by the service provider 102 via the content server(s) 104. One or more services of the service provider 102 can receive these requests and allocate physical computing resources to support the workloads, such as usage of computer processors, memory, storage drives, computer network interfaces, and/or other hardware resources of a computing device, for the user.

In certain embodiments, the service provider 102 may utilize virtualization technologies such that the computing devices can each host multiple virtual machine (VM) instances that appear and operate as independent computing devices to support workloads of users. Rather than allocating all of the computing resources of a physical computing device to support a single workload for a user, the computing resources of a physical computing device can be allocated amongst multiple VM instances that support different workloads. The service provider 102 supports many different types of workloads on behalf of users, and these workloads often have different computing resource needs. A workload may be implemented by a designated set of computing resources and the workload itself can be considered as code or logic that performs functionality using the computing resources. The service provider 102 may support a wide variety of workloads, such as web servers, databases, customer-facing applications, distributed datastores, batch processing, machine/deep learning training and/or inference, online gaming, video encoding, memory caching, and/or any other type of workload that can be supported by computing resources of the service providers 102.

In some embodiments, the service provider 102 may be associated with one or more computing architectures, and one or more of the computing architectures may be implemented in a distributed or non-distributed computing environment. The computing architecture may include one or more processors 112 and one or more computer readable media ("CRM") 114 that stores various modules, applications, programs, or other data. The computer-readable media 114 may include instructions that, when executed by the one or more processors, cause the processors to perform the operations described herein. That is, the service provider 102 may include one or more processors 112, memory, logic, components, modules, computer-executable instructions, etc. that facilitate operations performed by the service provider 102, as described herein.

The processor(s) 112 may include a central processing unit (CPU), a graphics processing unit (GPU), both CPU and GPU, or other processing units or components known in the art. Additionally, each of the processor(s) 112 may possess its own local memory, which also may store program modules, program data, and/or one or more operating systems. Moreover, embodiments may be provided as a computer program product including a non-transitory machine-readable storage medium 114 having stored thereon instructions (in compressed or uncompressed form) that may be used to program a computer (or other electronic device) to perform processes or methods described herein. The machine-readable storage medium 114 may include, but is not limited to, hard drives, floppy diskettes, optical disks, CD-ROMs, DVDs, read-only memories (ROMs), random access memories (RAMs), EPROMs, EEPROMs, flash memory, magnetic or optical cards, solid-state memory devices, or other types of media/machine-readable medium suitable for storing electronic instructions. Further, embodiments may also be provided as a computer program product including a transitory machine-readable signal (in compressed or uncompressed form). Examples of machine-readable signals, whether modulated using a carrier or not, include, but are not limited to, signals that a computer system or machine hosting or running a computer program can be configured to access, including signals downloaded through the Internet or other networks.

In various embodiments, the service provider 102 may maintain, and the content server(s) 104 may store, a server datastore 116 that includes current objects 118. The current objects may be accessible and modifiable by the users 106 via the corresponding user devices 108. As stated herein, the current objects 118 may be of any type and may include the most current versions of the objects. For instance, each of the objects included in the server datastore 116 may be the most current version of the objects, which may be the same as or different than the version of objects stored or being modified by users 106.

The users 106 may access, retrieve, save, and modify the current objects 118 via corresponding user devices 108. For instance, the users 106 may access the current objects 118 within the server datastore 116 and make modifications to the current objects 118, as well as having the ability to create new objects that are subsequently stored in the server datastore 116. In addition to the user devices 106 including one or more processors 120 and computer-readable media 122, which may be similar to or different than the processor(s) 112 and the computer-readable media 114, respectively, the user devices 108 may also include a local datastore 124 that stores local objects 126. In some embodiments, the users 106 may request or query for one or more of the current objects 118 maintained in the server datastore 116. Upon receiving a current object 118, the current object 118 may be stored within the local datastore 124 as a local object 126. That is, the local objects 126 maintained in the local datastore 124 of a user device 108 correspond to the current objects 118 that are maintained in the server datastore 116. As a result, the user device 108 need not be connected to the network 110 in order to access, view, modify, etc., the current objects 118 stored in the server datastore 116.

In some embodiments, the users 106 may include customers, developers, etc. that create mobile applications, web applications, websites, blogs, word-processing documents, spreadsheets, and any other documents that are created using computer code. The user devices 108 may include mobile devices (e.g., mobile telephones, tablet devices, laptop computers, etc.), desktop computers, game consoles, and any other device used to create and modify objects and/or to access the current objects 118 maintained in the server datastore 116. When connected to the network(s) 110 (in an "online" state), the user devices 108 may access the current objects 118. However, when disconnected to the network(s) 110 (in an "offline" state), the user devices 108 may be unable to access the current objects 118 stored in the server datastore 116, but are able to access the local objects 126 maintained in the local datastore 124 of the user devices 108. Assume for the sake of argument that a user 106 is a developer that is building a mobile application for mobile devices. In some instances, the user's 106 user device 108 may be offline (i.e., not connected to the network(s) 110). When in an online state, the user 106 may save the mobile application and data associated therewith (e.g., a unique identifier (ID), a title, content, etc.) in either the server datastore 116 or the local datastore 124 of the user device 108. If stored locally, the local objects 126 in the local datastore 124 may be synchronized with the current objects 118 in the server datastore 116 so that both the local datastore 126 and the server datastore 116 maintain the current version of the object (e.g., the mobile application). If the user device is in an offline state, the mobile application can be saved to the local datastore 124 and then subsequently synchronized with the server datastore 116 so that the version of the mobile application in the server datastore 116 reflects any modifications, new features, etc., implemented by the user 106. When the user device 108 transitions to an online state, synchronization performed by the service provider 102 allows for the local objects 126 to be updated within the local datastore 124 and to only receive any modifications to the object that have occurred since the user device 108 has been offline. In various embodiments, the local datastore 124 may have local indexing, query, and search properties along with an API to allow users 106 to read, write, and subscribe to objects.

While user devices 108 are in an online state, the local datastores 124 of the user devices 108 may be synced with the server datastore 116 so that the version of the local objects 126 is the same as the version of the current objects 118. However, it is conceivable that multiple users 106 are accessing and modifying the same object simultaneously. It is also conceivable that, while a user is accessing or modifying a local object 126 when his/her user device 108 is in an offline state, a different user 106 may be accessing or modifying the same object. When a modified object is provided by a user device 108, the service provider 102 may automatically detect that the modified object is different than a current version of a corresponding current object 118 stored in the server datastore 116. The service provider 102 may also resolve the conflict by rejecting the modified object or merging the modified object with the corresponding current object 118 in the server datastore 116. Such conflict detection and resolution may reduce, and possibly eliminate, potential data loss. For instance, if the modified object is different than the current version of the object in the server datastore 116, the service provider 102 may reject the modified object and request that the user 106 make those modifications to the current version of the object in the server datastore 116. If the conflict between the modified version of the object and the current version of the object can be resolved, the modified object and the current object 118 can be merged such that the current object 118 includes the modifications or mutations associated with the modified object.

Any number of type of application programing interfaces (APIs) or schemas can be used to facilitate the conflict detection/resolution and synchronization of objects performed by the service provider 102. In some instances, GraphQL may be used by the service provider 102 and the user devices 108. For the purpose of this discussion, GraphQL is a data query and manipulation language for APIs and a runtime for fulfilling queries with existing data. Moreover, GraphQL may be used to develop web APIs and it allows the users 106 to define the structure of the objects that are created and modified, and the same structure of the data (e.g., updated objects) is returned from the content server(s) 104, thereby preventing large amounts of data to be returned. GraphQL supports reading the objects, writing (or mutating or modifying) the objects, and subscribing to changes in the objects in real-time (or near real-time). In other embodiments, representational state transfer (REST) and other web service architectures may be utilized.

Accordingly, the service provider 102 provides for an encryptable and queryable on-device datastore for various types of users 106, such as web, mobile, and Internet of Things (IoT) developers. The service provider 102 provides a unitary programing model (using either a GraphQL-based programming interface or standard objects) for transparently synchronizing objects with network-based services and leveraging shared or distributed objects without writing additional code for offline/online scenarios.

As stated herein, the users 106 may create objects (e.g., mobile applications, blogs, websites, etc.), save the objects to the local datastore 124 as local objects 126 and then send the created objects to the service provider 102, where the objects are stored as current objects 118 within the server datastore 116. The current objects 118 are the most current version of the objects and are accessible to other users 106. An object version component 128 of the service provider 102 may assign a version to the current objects 118. The current version of an object may correspond to a version of the object that users 106 are able to access and/or modify. Provided that a user 106 makes changes to an object that do not constitute a conflict, a version incrementer 130 increments the current version to a new version. For instance, if the version of an object was "2" and a user 106 made acceptable modifications to the object, the version of the object will be incremented by one to "3". Accordingly, the object version may indicate the most current version of the object and may assist in resolving conflicts with respect to the object.

When a user 106 seeks to modify a current object 118, the user device 108 of the user 106 may send a corresponding query to the service provider 102, which may send the requested current object 118 to the user device 108 in response. If the user 106 modifies or mutates the requested current object 118, a new instance of the object will be created, the new instance of the object is saved to the local datastore 124 of the user device 108, and the new instance of the object is sent to the service provider 102. Provided that the modification to the object does not introduce a conflict, the modified object is saved as a current object 118 within the server datastore 116. If the object is newly created, the object version component 128 will assign a version to the object (e.g., "1"). If the object previously existed in the server datastore 116 and was modified, resulting in no conflicts or conflicts that are resolved, the version incrementer 130 will increment the previous version of the object (e.g., increment the version from "1" to "2").

Other systems and/or users 106 may query the server datastore 116 for particular objects. The service provider 102 may execute the query and provide a list of objects, including versions or version numbers for each of the objects. The list of objects, and possibly the objects themselves, may be saved to the local datastore 124, along with the current version of each of the objects. In some embodiments, the version or version numbers of the objects are monotonically increased and are incremented when a modification is made to the objects. The version or version numbers of the objects are incremented at the service provider 102 so that users 106 constantly have access to the most recent or current versions of objects. For instance, when a user 106 makes an update or a modification to an object, the user device 108 of the user 106 sends the update/modification as a payload to the service provider 102, as well as the particular version of the modified object. The version of the object modified by the user 106 may be the same as the current version of the object stored by the service provider 102, but possibly different. Provided that the write to the object succeeds (e.g., there is no conflict or the conflict is resolved), the service provider 102 updates the object in the server datastore 116 to reflect the modification, and the version incrementer increases or increments the version for that object. The version may correspond to a number, a letter, or one or more characters. Accordingly, the version can be incremented from "1" to "2", from "b" to "c", and so on. When a user 106 (and possibly the same user 106) seeks to access that object (e.g., the user device 108 of the user 106 sends a query for the object), the service provider 102 will return the most recent or current version of the object, which may include the most recent modification written to the server datastore 116.

A conflict detection component 134 of the service provider 102 may detect an object conflict 136 with respect to an object. In some embodiments, two different users 106 may modify an object at the same time and, provided that the modifications are different, the simultaneous modification of the object will create two different versions of the object. If one of the versions is treated as the current version of the object, the modifications by one of the users may not be considered, which may result in data loss. The conflict detection component 128 may determine if an object conflict exists between these different modifications of the object. In a different embodiment, a first user 106 and a second user 106 may have modified or updated an object, where the first user 106 may be online and connected to the network(s) 110 and the second user 106 may be offline and not connected to the network(s) 110. In this scenario, since the first user 106 was online, the modifications made by the first user 106 may be accepted by the service provider 102 and the version of the object stored in the server datastore 116 may be incremented/updated, resulting in a new and current version of the object. Once the second user 106 comes online, the modified object associated with the second user 106 may be sent to the service provider 102. However, the modified object sent by the second user 106 may not be consistent with the updated and current version of the object, which includes the modifications made by the first user 106. In this example, the conflict detection component 134 will determine if a conflict exists between the current version of the object stored in the server datastore 116 and the modified object provided by the second user 106. As illustrated in FIG. 1, the user 106 via his/her user device 108 may transmit modified object data 132 to the content server(s) 104 of the service provider 102. The modified object data 132 may include the modified object itself or data representing the modification or mutation to the object made by the user 106.

The conflict detection component 134 may determine if an object conflict 136 exists using a two-part process. First, it is determined whether the version of the modified object provided by a user 106 is different than the current version of the object stored in the server datastore 116. The version of an object may be determined based on a version counter, which may be a monotonically increasing counter and may be represented by a numerical value that represents the version of the object. The version counter may include one or more components, including a counter that tracks all of the updates to the object itself, a tuple (counter, timestamp) that tracks updates across all of the objects, and/or a bit-flag that indicates the object can be (or is to be) deleted (e.g., for prior versions of objects). For instance, the conflict detection component 134 may compare the version counter for the modified object and a version counter for the corresponding object stored in the server datastore 116. If the version of the modified object is the same as, or is equal to, the version of the object stored in the server datastore 116, no object conflict exists and the modified object may be merged with the stored object. The version of the stored object will be incremented and the resulting object in the server datastore 116 will reflect the modifications made by the user 106. However, if the current version of the stored object is different or higher than the version of the modified object, then an object conflict 136 may exist. For instance, if the current version of the object stored in the server datastore 116 is "3" and the modified object has a version of "2", the modified object may not include modifications that have been made to the object. That is, the data/information associated with the modified object may be outdated.

If the version of the modified object is different than the current version of object maintained in the server datastore 116, individual fields of the modified object and the object maintained by the server datastore 116 may be analyzed. As explained in additional detail herein, if the individual fields of the two objects are not inconsistent, then the objects may be merged and the version may be incremented. However, if an inconsistency is determined between a particular field of the modified object and the object maintained by the server datastore 116, a conflict resolution component 138 of the service provider 102 may resolve the conflict, potentially utilizing an object merge process 140.

In some embodiments, the conflict resolution component 138 may identify fields within the modified object, where different fields of an object may correspond to, list, store, identify, etc., different types of data/information or data/information in different formats. The fields of the modified object may be compared to the fields of the corresponding object stored in the server datastore 116 to determine if any inconsistencies exist between a particular field. In some embodiments, a hash function, such as a keyed-hash message authentication code (HMAC), and/or a key-value object database may be used to compare the fields of the modified object and the stored current object 118. In other embodiments, the service provider 102 may traverse the object with various types of computer code and/or use recursive analysis to determine differences or inconsistencies within different fields of the modified object and the stored current object 118. As a result of traversing or analyzing the modified object, the conflict resolution component 138 may return values of fields of the modified object that have been modified. In some embodiments, the service provider 102 may run or execute database predicates or expressions that determine a change set for the modified object, where the change set identifies modifications of the modified object with respect to the stored current object 118. Prior to writing the modified object to the server datastore 116, the service provider 102 may determine if modifications to data within particular fields is inconsistent with the corresponding fields in the stored current object 118.

Provided that the conflict detection component 134 detects an object conflict 136 associated with a received modified object and a corresponding object stored in the server datastore 116, the conflict resolution component 138 can resolve the conflict in several different ways. For instance, assume that multiple users 104 are able to access and modify the current objects 118 without requiring locks on those objects. Upon receiving a modification of an object from a user 106, before writing that modification to the object within the server datastore 116, the service provider 102 may verify that no other modifications have been made to the object (e.g., modifications made by other users 106). If the service provider 102 determines that conflicting modifications exist, the service provider 102 may reject one or both of the modifications and cause the object to remain in its current state. As an illustrative example, upon receiving a modified object from a user 106, the service provider 102 may determine the version of that modified object. If the version of the modified object is different than the version of the object stored in the server database 116, the service provider 102 will reject the modification (e.g., reject the write) and send a failure notification to the user 106 that sent the modified object. The notification may indicate that the modification to the object related to a prior version, and not a current version, of the object. The notification may also state that, if the user 106 still seeks to make the modification to the object, the user 106 may make the same modification to the current object 118 saved in the server datastore 116. The user 106 may discard the modification and accept and save the current object (having the current version) to its local datastore 124. The user 106 may resubmit the modification to the object using the current version of the object. Upon the user 106 resubmitting the modified object, the service provider 102 may again confirm that the version of the modified object is the same as the version saved in the server datastore 116.

Another option to resolve a conflict between (1) a modified object and a current object 118 or (2) two modified objects provided by two different users 106 can be based on custom or business logic associated with at least one of the users 106. For instance, the user 106 can elect to invoke a Lambda function in which various information can be passed to the function. Such information may include the object version of the object, the modification or data the user 106 attempted to write that is in conflict, any additional variables sent by the user 106, and/or the identity of the user 106. The user 106 is able to elect their own strategy with the business logic and, if the user 106 chooses the write to be a winning condition, the business logic (e.g., the Lambda function) will resubmit the write to the object to the service provider 102 with an updated version of the object to attempt the write again. For the purposes of this discussion, Lambda functions or expressions may correspond to blocks of code that can be assigned to variables, passed as an argument, or returned from a function call, in languages that support high-order functions.

The conflict resolution component 138 may also utilize the object merge process 140 to resolve any object conflicts 136 between a modified object received from a user 106 and the current object 118 stored in the server datastore 116. The object merge process 140 may automatically merge the modified object and the current object 118 provided that there are no inconsistencies associated with the data/information being modified. The object merge process 140 may also merge a first modified object provided by a first user 106 and a second modified object provided by a second user 106, where the first and second modified objects correspond to the same object. For instance, if two different users 106 have made modifications or mutations to different instances of the same object (e.g., a blog), the object merge process 140 may analyze individual fields of the object (e.g., name, content, rating, etc., of the blog) to determine if the modified objects can be merged. At least one purpose of the object merge process 140 is to prevent loss of data and/or to prevent automatically sending failure notifications to users 106 in the case of a conflict, and to instead merge the objects provided that no inconsistencies in fields or data of the object exists.

In some instances, the service provider 102 may determine that there are no inconsistencies between individual fields of the modified object and the current object 118 or between individual fields of two different modified objects. For instance, the modified object may include a new field of data not present in the current object 118 and/or data/information within an existing field that is in addition to the data/information in the current object 118. That is, the new field of data or the new data/information is not inconsistent with the fields or data/information associated with the current object 118. With respect to two modified objects, the first modified object may include a modification associated with a first field and the second modified object may include a modification associated with a second field that is different than the first field. Since the modifications related to different fields associated with the same object, the modifications are not inconsistent with one another. In these scenarios, the objects can be merged such that the resulting current object 118 includes the modification (or both modifications if there are two modified objects). The version of the resulting current object 118 may be incremented to reflect that it is now the current version of the object. If a single modified object is received, the version of the object may be incremented by one. However, if the merging is between two modified objects, the version of the object may be incremented by two since two different modifications have been made to the object. Each user 106 that submitted a modified object may receive the updated object having the modification(s) with the incremented version of the object.

In certain embodiments, with respect to at least one modified object, the modification to a field of the object may be inconsistent with the corresponding field in the current object 118 from the server database 116. For instance, the modified object may include a modification to data or a value that exists in the current object 118, which may cause the two objects to conflict. In the context of two modified objects from different users 106, one of the modified objects may modify a value or field and the other modified object value may also modify the same value or field, resulting in a conflict between the two modified objects. In either scenario, the service provider 102 may reject the modified objects and instruct the user(s) 106 to resubmit the modifications to the current version of the object stored in the server datastore 116.

Additionally, if the modified object merely adds a new field of data or adds data or values to a field of the current object 118, the object merge process 140 may update the current object 118 to include the modifications in the modified object. The version of the object may also be updated, such as a version counter being incremented by one. In other embodiments, modified objects sent by multiple users 106 may add or update data/values in the same field of the object. The modifications, however, may not conflict or be inconsistent if the modifications relate to different data/values. In that scenario, the object merge process 140 may merge the two modified objects, resulting in an updated object. For instance, the modifications associated with the modified objects may merely add data/values to a list of data/values. Since two modified objects are merged in this scenario, the version of the object may also be updated, such as a version counter being incremented by two, which reflects modifications made by two different users 106. The merged and updated object may be provided to the user device 108 and may be referred to herein as current object data 142. That is, the modified object data 132 may represent modifications and writes to objects performed by users 106 and the current object data 142 may correspond to updated objects that include the modifications made by the users 106 once the conflict detection and conflict resolution processes have been performed by the service provider 102. The modified object data 132 provided by the user device 108 and the current object data 142 sent by the service provider 102 may represent the synchronization of a particular object. The updated object corresponding to the current object data 142 may then be applied to the local datastore 124 of the user device 108. Furthermore, it is noted that illustrative examples of the object merge process, and further description relating thereto, is illustrated and described with respect to FIGS. 2-6.

As shown in FIG. 1, the service provider 102 may also include an object synchronization component 144, which may use a current object table 146 and/or an object variation table 148 to synchronize the local datastores 124 of user devices 108 with the server datastore 116. As a result, the local datastore 124 of each user device 108 may reflect the most current versions of objects maintained by the service provider 102. The current object table 146 may include a list of, or otherwise identify, the current versions of the objects and the object variation table may include a list of, or otherwise identify, changes or modifications to the current objects 118. For instance, the object variation table 148 may include modifications or updates to objects since user devices 108 were last synchronized with the current objects 118 in the server datastore 116, such that only the modifications/updates to the objects are provided to the user devices 108. In some embodiments, the current object table 146 and/or the object variation table 148 may be specific to different users 106, such that the current object table 146 and/or the object variation table may be associated with different user accounts or profiles. For instance, a first user account/profile of a first user 106 may include a first current object table 146 and a first object variation table 148 associated with the first user 106, a second user account/profile of a second user 106 may include a second current object table 146 and a second object variation table 148 associated with the second user 106, and so on. Moreover, the conflict detection and resolution of modifications to objects may be performed by a first service associated with the service provider 102 and the synchronization of objects, including maintenance of the current object table 146 and the object variation table 148, may be performed by a second, different service of the service provider 102.

Prior versions of objects may be deleted from the server datastore 116, and the service provider 102 may cause corresponding objects to be removed from (e.g., deleted) from local datastores 124 of user devices 108. Synchronization of the local datastores 124 with the server datastore 116, as well as the deletion of prior versions of objects from local datastores 124, is explained in additional detail with respect to FIG. 9. As illustrated in FIG. 1, object synchronization 150 may correspond to the local datastore 124 being synchronized with the most current versions of objects maintained in the server datastore 116. That is, the object synchronization 150 may correspond to objects being synchronized by the service provider 102 on an ongoing basis and/or as users 106 come online after being offline for a period of time. For instance, the object synchronization 150 may correspond to a subscription flow or model in which local objects 126 stored in the local datastore 124 are updated and/or replaced based on the most recent versions of the current objects 118 maintained by the server datastore 116. For instance, the service provider 102 may cause the local objects 126 stored in the local datastore 124 to be modified based on modifications made to the corresponding objects stored in the server datastore 116. Alternatively, or in addition, the service provider 102 may provide the most recent versions of various current objects 118 to user devices 108 (to be stored in the local datastore 124), and the service provider 102 may cause prior versions of the local objects 126 stored in the local datastore 124 to be deleted.

Accordingly, the service provider 102 described herein allows users 106 to access and modify objects maintained by the service provider 102 in either an online or offline state. The service provider 102 further employs a conflict detection and resolution process to ensure that object conflicts are resolved in a predictable manner and so that the most current version of objects are maintained in a centralized datastore. Moreover, the service provider 102 synchronizes the objects listed and/or stored in local datastores of user devices 108 with the most current versions of the objects such that users 106 are able to access and modify the most current versions of the object on an ongoing basis. Such techniques avoid, and potentially prevent, data loss and allow for an automated conflict resolution process in which conflicting objects are merged and stored. Versions of the objects are updated and incremented following the merging of objects.

Figure 2:
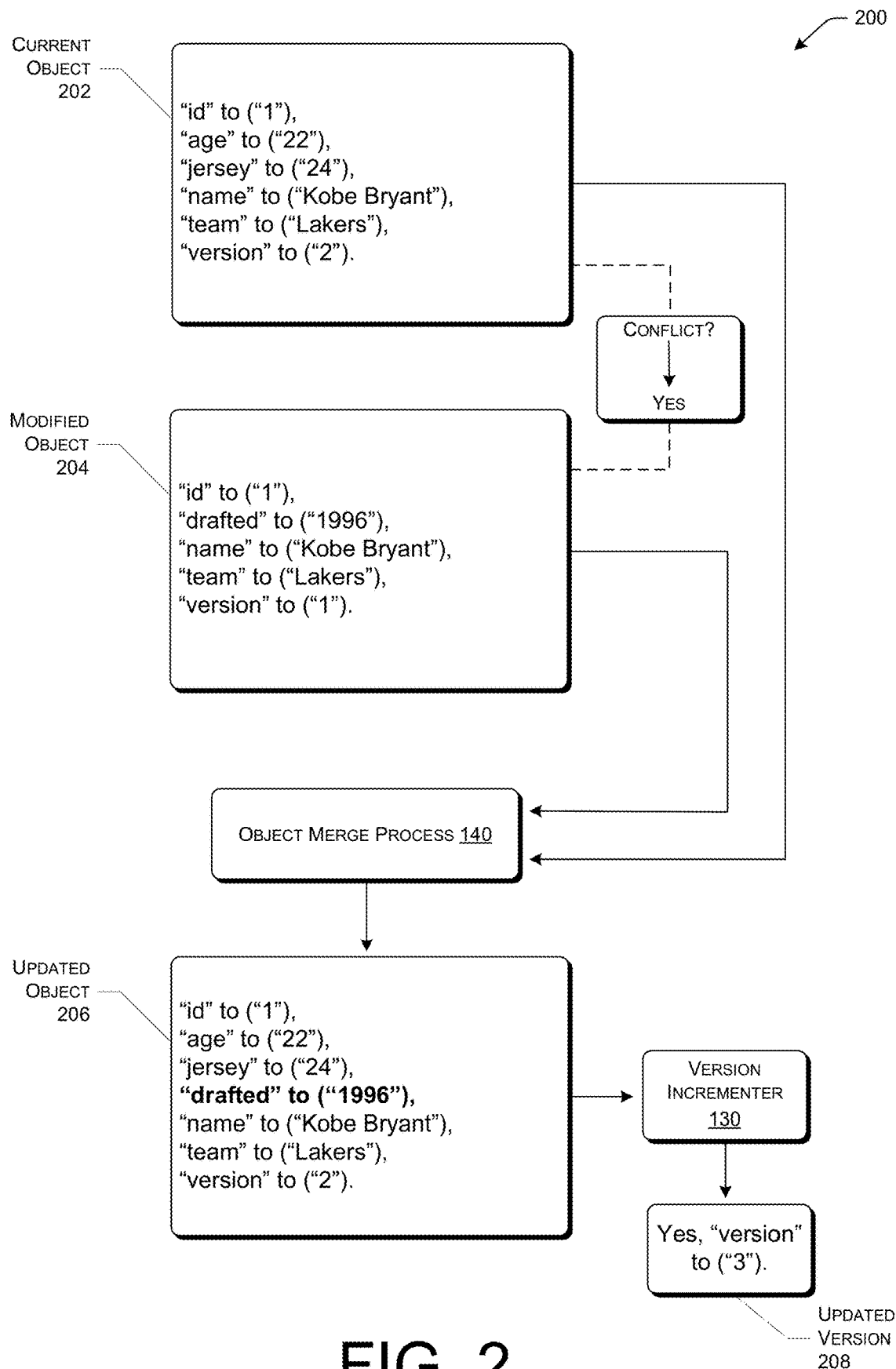
FIG. 2 is a schematic diagram of an example process in which an object merge process merges a current version of an object and a modified version of an object, resulting in an updated object.

FIG. 2 is a schematic diagram 200 of an automated object merge process that resolves a conflict between two different objects. For the purpose of FIG. 2, as well as FIGS. 3-6, the current object 202 may correspond to a current version of an object (e.g., a current object 118) stored within the server datastore 116, the modified object 204 may correspond to the object as modified by a user 106, and the updated document 206 may correspond to a resulting object once the service provider 102 has resolved any conflicts between the current object 202 and the modified object 204. For instance, the updated object 206 may result from merging the current object 202 and the modified object 204, and the resulting updated object 206 may be maintained in the server datastore 116 and be accessible by users 106. The updated object 206 may subsequently represent the most current version of the object. Upon determining the updated object 206, the version of the object may be incremented from the version of the current object 202, provided that the objects were merged as a result of the object merge process 140 performed by the service provider 102. For the purpose of this discussion, the object merge process 140 occurs only at the service provider 102/content server(s) 104, as opposed to at the local datastores 124 of the user devices 108. Once objects are updated and versions are incremented at the service provider 102, the local datastores 124 of user devices 108 may be synchronized with the server datastore 116, which maintains the current versions of objects.

In different embodiments, the current object 202 may instead be an additional modified object provided by a user 106. As a result, the service provider 102 may determine whether a conflict exists between a first modification to an object provided by a first user 106 and a second modification to the same object provided by a second user 106. Provided that the conflict can be resolved, the resulting updated object 206 may reflect the modifications to the object made by both users 106.

As illustrated in FIG. 2, the current object 202 has a version of "2", while the modified object 204 has a version of "1". Accordingly, the modified object 204 is out of date and the user 106 made a modification to a version of the object that is not the most current version of the object. Since the modified object 204 provided by the user 106 is not the most recent version of the object, a conflict exists between the current object 202 and the modified object 204 (Conflict?→Yes). If the version of the current object 202 and the version of the modified object 204 were determined to be the same (e.g., "2"), then a conflict would not occur and the current object 202 and the modified object 204 would be merged. The resulting updated object 206 would reflect the modifications included in the modified object and the version of the updated object would be incremented to "3" (e.g., the version of the current object ("2"), plus one).

The data/information included in the object relates to Kobe Bryant, a retired professional basketball player that played twenty seasons for the Los Angeles Lakers of the National Basketball Association. The current object 202 includes multiple types of fields and data relating to those fields, such as "id" ("1"), "age" ("22"), "jersey" ("24"), "name" ("Kobe Bryant"), "team" ("Lakers"), and "version" ("2"). The modified object 204 includes some of the same fields as the current object 202, as well as an additional field and data relating to the additional field, such as "drafted" and "1996". Although the object relates to Kobe Bryant, it is contemplated that the fields and/or data/information associated with the object may relate to any subject and may include any type of content (e.g., text, images, graphs, etc.).

After determining that a conflict potentially exists between the current object 202 and the modified object 204 as a result of the "version" of the current object 202 ("2") being greater than the version of the modified object 204 ("1"), the service provider 102 may determine whether individual fields of the current object 202 and the modified 204 are inconsistent with one another and, therefore, conflict. Here, the modified object 204 includes a field ("drafted") and corresponding data ("1996") that is not included in the current object 202, nor does it appear that this modified/added data conflicts with an existing field or data in the current object 202. Accordingly, the object merge process 140 may merge the current object 202 and the modified object 204, which results in the updated object 206. The updated object 206 includes the fields and corresponding data of the current object 202 plus the additional field and corresponding data (i.e., "drafted" and "1996") from the modified object 204. As a result of merging the two objects, the version incrementer 130 may increment the version of the current object 202 such that the updated object will have an updated version 208 of "3". The version of the current object 202 may be incremented as part of the object merge process 140 or after the current object 202 and the modified object 204 have been merged. The updated object 206 will be stored in the server datastore 116 and be accessible to users 106 that desire to access and/or modify the object.

If the current object 202 and the modified object 204 were both modified objects from users 106, the object merge process 140 would merge the two modified objects since the corresponding fields of the objects do not conflict, nor are they inconsistent. Here, two users 106 are writing data to the same object but, even though the object versions are different, the fields do not conflict. As a result, the updated object 206 will be a union of the two writes to the object. Since two modifications would be made to the underlying object, the version incrementer 130 would increment the version counter by two, such as from "1" to "3" or from "2" to "4". FIG. 2 is an example of having conflicting versions of an object, but with non-conflicting fields (or non-conflicting primitives), which causes the object merge process 140 to merge all of the fields into a single object (e.g., the updated object 206).

Figure 3:
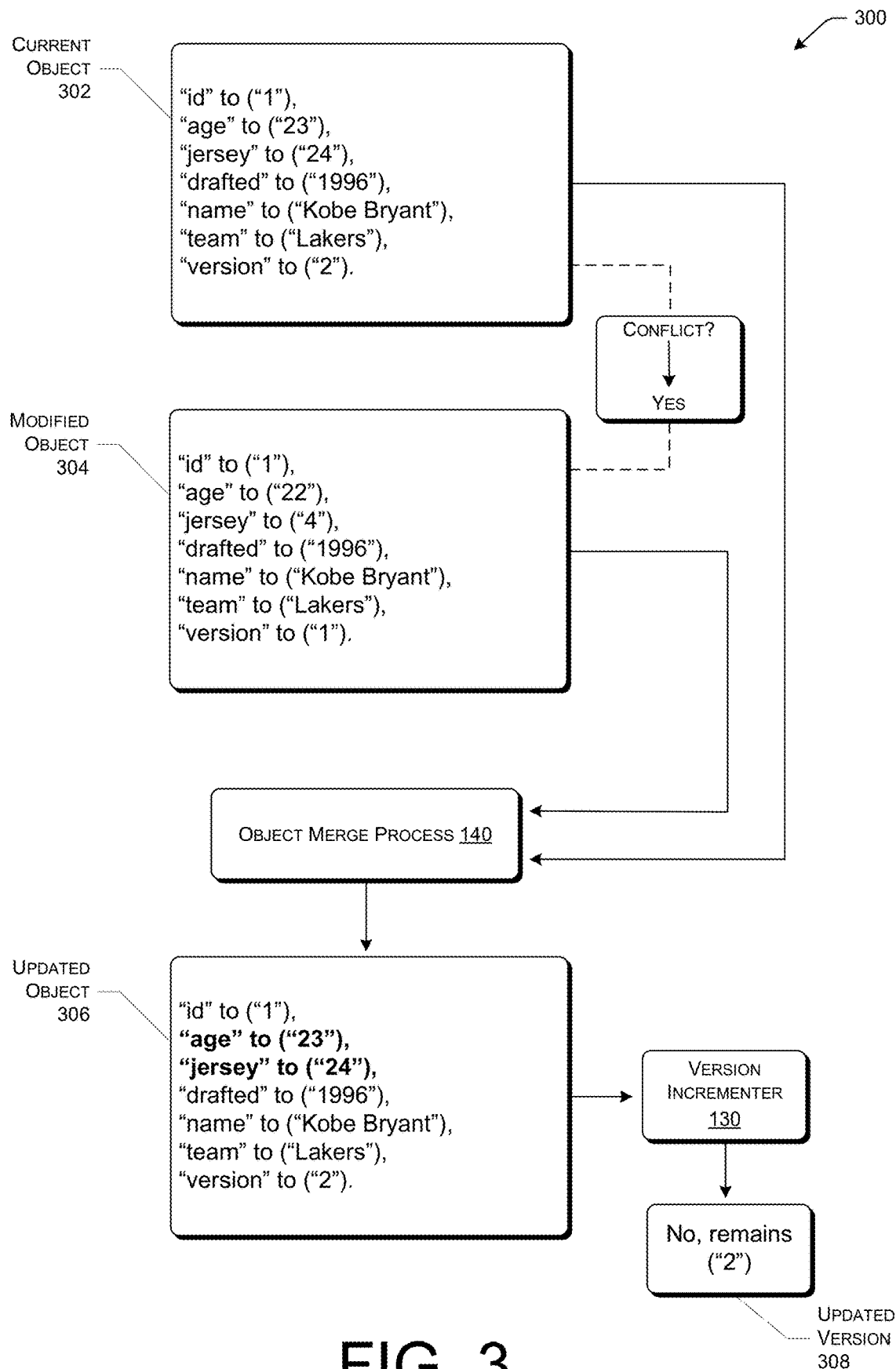
FIG. 3 is a schematic diagram of an example process in which an object merge process rejects a modification to a current version of an object.

FIG. 3 is a schematic diagram 300 of the automated object merge process similar to that illustrated in FIG. 2. As in FIG. 2, the object includes data/information relating to Kobe Bryant, the current object 302 includes various fields and corresponding data, and the modified object 304 includes various fields and corresponding data. Here, the current object 302 has a version of "2", while the modified object 304 has a version of "1". Accordingly, due to the version of the modified object 304 not being the same as the version of the current object 302, a conflict exists between the current object 302 and the modified object 304 (Conflict?→Yes).

As shown, the fields of the current object 302 and the modified object 304 are the same (e.g., "id", "age", "jersey", "drafted", "name", "team", and "version"), but the data included in two of those fields is different. For instance, in the "age" field, the current object 302 specifies that the "age" is "23" while the modified object 304 specifies that the "age" is "22". The "jersey" field is similarly different in that the current object 302 specifies that the "jersey" number is "24" while the modified object 304 specifies that the "jersey" number is instead "8". Since the data within the "age" and "jersey" fields are different, there is a conflict between these two fields. As the current object 302 is considered to be the most recent version of the object, the data included in the current object 302 is presumed to be correct/accurate. As a result, the object merge process 140 will refrain from merging the current object 302 and the modified object 304. That is, in the updated object 306, which is the same as the current object 302, the "age" field and the "jersey" field will remain as "23" and "24", respectively. The fields in the modified object 304 vary from the current object 302 possibly because the user 104 is modifying or updating a prior version of the object. Since the modified object 304 is not merged with the current object 302, the service provider 102 may notify the user 106 and indicate that the modification of the object is rejected. The service provider 102 may also provide, to the user 106, the most recent version of the object in case the user 106 would prefer to resubmit any modifications to the object.

If the current object 302 and the modified object 304 were both modified objects from users 106, the object merge process 140 would refrain from merging the two modified objects since the corresponding fields of the objects conflict. Here, the updated object 306 would be the current object 302 due to the current object 302 since it has a higher version number ("2"). In some instances, if data within a field is an integer, the updated object 306 will include the data having the highest integer. For instance, for the "age" field, the updated object 306 would include "23" instead of "22".

FIG. 3 is an example of having conflicting versions of an object with conflicting fields (or conflicting primitives), which causes the object merge process 140 to reject the modified object 304 and refrain from merging the current object 302 and the modified object 304. Accordingly, the updated object 306 will remain the same as the current object 302. Moreover, the version counter for the updated version 308 will not be incremented and will remain at "2". However, in some embodiments, each time the object merge process 140 merges two objects, the version of the current object 302 may be incremented. For instance, even if the result of the object merge process 140 is an updated object 306 that is identical to the current object 302 (e.g., the modification was rejected due to a conflict), the current version of the current object 302 will still be incremented and the updated object 306 will have a new, updated version 308. The updated version 308 will reflect that, even if the current object 302 was not modified, the current object 302 was merged with a different object via the object merge process 140.

Figure 4:
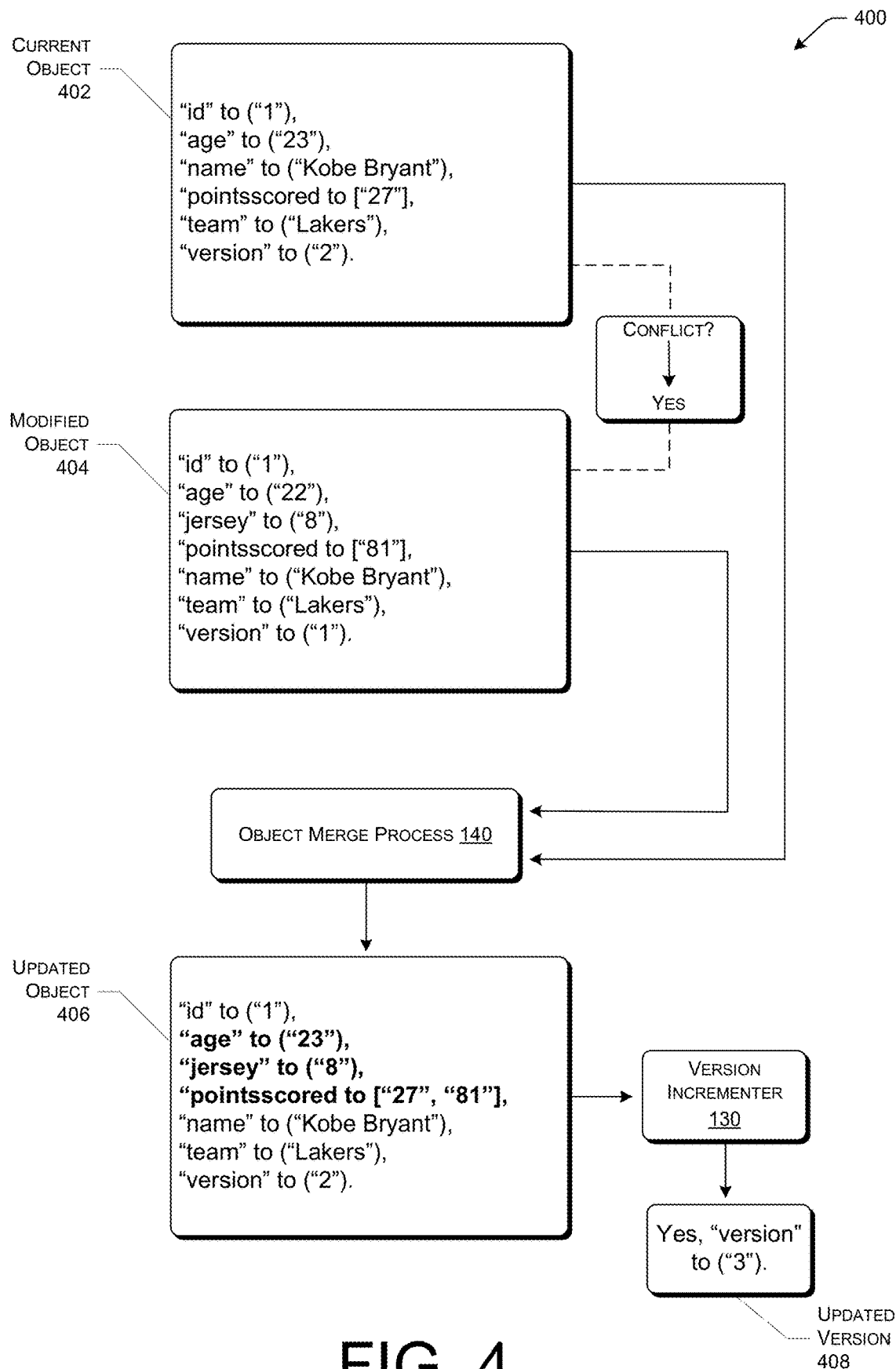
FIG. 4 is a schematic diagram of an example process in which an object merge process merges a current version of an object and a modified version of an object, resulting in an updated object.

FIG. 4 is a schematic diagram 400 of the automated object merge process similar to that illustrated in FIGS. 2 and 3. As in FIGS. 2 and 3, the object includes data/information relating to Kobe Bryant, the current object 402 includes various fields and corresponding data, and the modified object 404 includes various fields and corresponding data. Here, the current object 402 has a version of "2", while the modified object 404 has a version of "1". Accordingly, due to the version of the modified object 404 not being the same as the version of the current object 402, a conflict exists between the current object 402 and the modified object 404 (Conflict?→Yes).

As shown, the fields of the current object 402 and the modified object 404 share many of the same fields. For instance, both the current object 402 and the modified object 404 have the fields of "id", "age", "name", "pointsscored", "team", and "version"). Moreover, the modified object 404 includes an additional field ("jersey") not included in the current object 302. The data corresponding to the "pointsscored" field in the current object 402 and the modified object 404 are different in that the current object 402 includes "27 while the modified object 404 includes "81".

Since the data within the "age" field is different, there is a conflict between this field. As the current object 402 is considered to be the most recent version of the object, the data included in the current object 402 is presumed to be correct/accurate. As a result, the object merge process 140 will refrain updating the current object 402 to include the "age" of "22" specified in the modified object 404, and the updated object 406 will remain the same with respect to the "age" field. Since the modified object 404 includes an additional field ("jersey") and corresponding data ("8") that is not included in the current object 402 and that does not appear to conflict with any fields of the current object 402, the "jersey" field and corresponding data "8" can be merged with the current object 402 such that the updated object 406 includes the "jersey" field.

Although both the current object 402 and the modified object 404 include the same "pointsscored" field, the object merge process 140 may merge this field so that the updated object 406 includes the "pointsscored" field with data from both the current object 402 and the modified object 404. For instance, the updated object 406 includes "27" and "81" within the "pointsscored field". Provided that the "pointsscored" field is intended to be a list, which is indicated by the square (or closed or hard) brackets (e.g., "[" and "]"), the object merge process 140 may merge the list so that the additional data from the modified object 404 is added to this list, while preserving the original order of the list. For instance, since "27 was listed in the current object 402, the updated object 406 will include "27" first and then "81" in the "pointsscored" field.

If the current object 402 and the modified object 404 were both modified objects from users 106, the object merge process 140 would perform the same merging as described above. However, due to two separate modifications to the object corresponding to two different users 106 the version number would be incremented by two from "2" to "4".

In certain embodiments, the type of fields or type of data within a field may determine whether data within a field should be replaced, updated, added to, and so on. More particularly, a field and/or data values within a field may have some indicator that indicates the type of field or the type of data within a field. For instance, a first indicator (e.g., items/values within parentheses—"(" and ")") may indicate that a value is a scalar value or an integer. An example of a scalar value is the "age" field where the value will be a single value, such as "22" or "23". Since the data within the "age" field are scalar values, the object merge process 140 may know that additional values should not be added to this field (e.g., it should include a single value as opposed to multiple values). A second indicator may indicate that the field relates to a list, array, or similar data structure that may include multiple values or items within the same field. For instance, the "pointsscored" field may include an indication (e.g., square brackets instead of parentheses) that this field is (or can be) a list of items/values. As a result, the value "81" may be added to the value "27" within the "pointsscored" field. The resulting updated object may have a field that includes a list that is comprised of each of the values/items from both the current object and the modified object. By different fields including indicators, the object merge process 140 may determine the type of field and merge the objects appropriately.

As an illustrative example, if a first field includes values within parentheses, the object merge process 140 may determine that the first field includes a scalar value and that a single value/item should be included in that field—either the value/item from the current object or the modified object. However, if a second field includes one or more values within square brackets, the object merge process 140 may know that the second field is a list, which can include a single or multiple items/values (e.g., a collection of values/items). Provided that such a field exists in the current object, the object merge process 140 may combine the values from both the second field in the modified object and the second field in the current object, such that the second field in the updated object includes values from both the modified object and the current object.

FIG. 4 is an example of having conflicting versions of an object with a non-conflicting field ("jersey"), a conflicting field ("age"), and a list in the same field ("pointsscored"), which causes the object merge process 140 to merge some, but not all, of the fields of the current object 402 and the modified object 404. As a result of the merging between the current object 402 and the modified object 404, the version counter will increment the version number from "2" to "3" such that the updated object 406 will have a version of "3".

Figure 5:
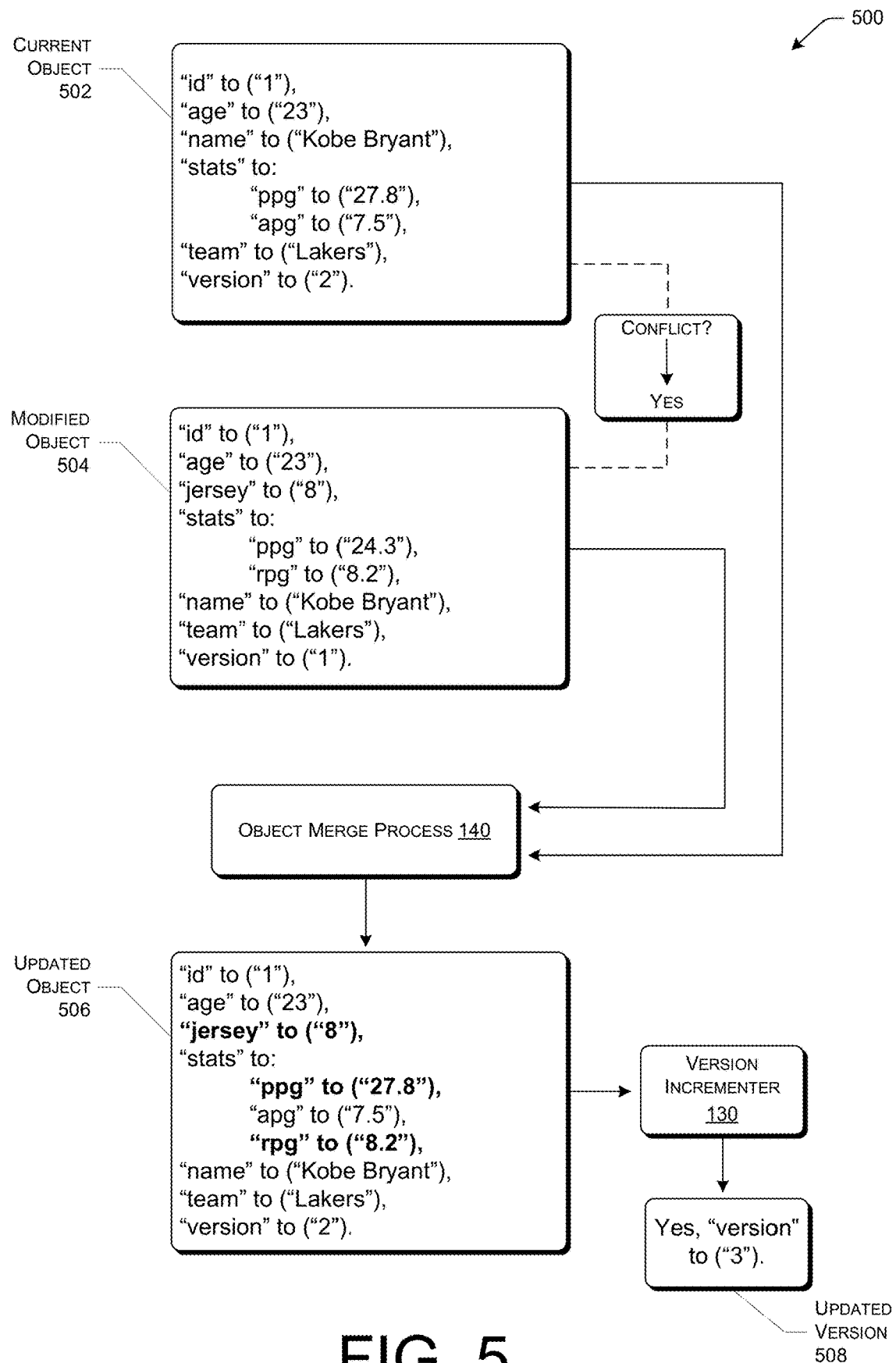
FIG. 5 is a schematic diagram of an example process in which an object merge process merges a current version of an object and a modified version of an object, resulting in an updated object.

FIG. 5 is a schematic diagram 500 of the automated object merge process similar to that illustrated in FIGS. 2-4. As in FIGS. 2-4, the object includes data/information relating to Kobe Bryant, the current object 502 includes various fields and corresponding data, and the modified object 504 includes various fields and corresponding data. Here, the current object 502 has a version of "2", while the modified object 504 has a version of "1". Accordingly, due to the version of the modified object 504 not being the same as the version of the current object 502, a conflict exists between the current object 502 and the modified object 504 (Conflict?→Yes).

As shown, the fields of the current object 502 and the modified object 504 share many of the same fields—"id", "age", "name", "stats", "team", and "version". However, the modified object 504 includes an additional field ("jersey") and corresponding data ("8") that is not included in the current object 502. Moreover, the data included within the "stats" field varies between the current object 502 and the current object 504. For instance, the current object 502 includes "ppg" (points per game) to "27.8" and "apg" (assists per game) to "7.5" and the modified object 504 includes "ppg" to "24.3" and "rpg" (rebounds per game) to "8.2". The "ppg" also varies between the current object 502 ("27.8") and the modified object 504 ("24.3"). Since the data within the "ppg" field is different, there is a conflict between this field. As the current object 502 is considered to be the most recent version of the object, the data included in the current object 502 is presumed to be correct/accurate. As a result, the object merge process 140 will refrain updating the current object 502 to include the "ppg" of "24.3" specified in the modified object 504, and the updated object 506 will remain the same with respect to the "ppg" field ("27.8"). Since the modified object 504 includes an additional field ("jersey") and corresponding data ("8") that is not included in the current object 502 and that does not appear to conflict with any fields of the current object 502, the "jersey" field and corresponding data "8" can be merged with the current object 502 such that the updated object 506 includes the "jersey" field.

Although both the current object 502 and the modified object 504 include the same "stats" field, the modified object 504 includes an additional type of data ("rpg" of "8.2"). Since this field is not included in the current object 502 and does not appear to conflict with other data within the "stats" field, the object merge process 140 may merge this field so that the updated object 506 includes "ppg" to "27.8", "apg" to "7.5", and "rpg" to "8.2". The "stats" field is an example of a nested structure/field. Regardless of the extent of nested structures in an object, provided that the modified object 504 includes new data or other data not present in the current object 502, and assuming that this new/other data does not conflict with other data in the current object 502, the new/other data will be added to current object 502.

If the current object 502 and the modified object 504 were both modified objects from users 106, the object merge process 140 would perform the same merging as described above. However, due to two separate modifications to the object corresponding to two different users 106 the version number would be incremented by two from "2" to "4". That is, the extent to which the version number/counter is incremented is dependent upon the number of users 106 that submitted modifications to the object.

FIG. 5 is an example of having conflicting versions of an object with a non-conflicting field ("jersey"), a conflicting field ("ppg" within "stats"), and conflicting nested maps, structures, or fields within the same field ("stats"), which causes the object merge process 140 to merge some, but not all, of the fields of the current object 502 and the modified object 504. As a result of the merging between the current object 502 and the modified object 504, the version counter will increment the version number from "2" to "3" such that the updated object 506 will have a version of "3".

Figure 6:
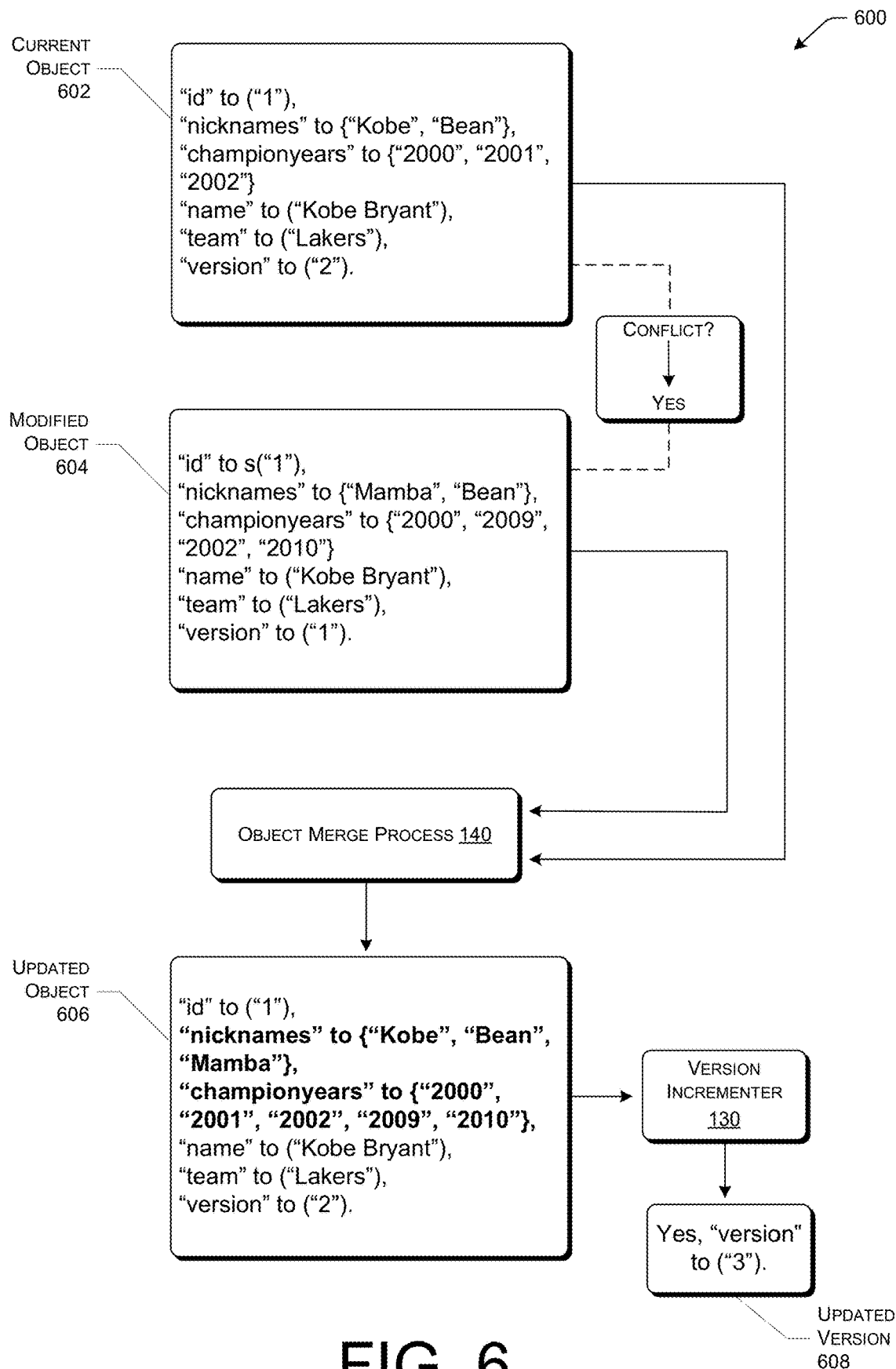
FIG. 6 is a schematic diagram of an example process in which an object merge process merges a current version of an object and a modified version of an object, resulting in an updated object.

FIG. 6 is a schematic diagram 600 of the automated object merge process similar to that illustrated in FIGS. 2-5. As in FIGS. 2-5, the object includes data/information relating to Kobe Bryant, the current object 602 includes various fields and corresponding data, and the modified object 604 includes various fields and corresponding data. Here, the current object 602 has a version of "2", while the modified object 604 has a version of "1". Accordingly, due to the version of the modified object 604 not being the same as the version of the current object 602, a conflict exists between the current object 502 and the modified object 604 (Conflict?→Yes).

As shown, the fields of the current object 602 and the modified object 604 share the same fields—"id", "nicknames" (nicknames of Kobe Bryant), "championyears" (years Kobe Bryant won a championship with the Lakers), "name", "team", and "version". However, the data included within the "nicknames" and "championyears" fields vary between the current object 602 and the modified object 604. Fields within an object may correspond to a scalar value, a list of items/values, and also a set of items/values. As illustrated in FIG. 6, the "nicknames" and "championyears" fields may have indicators indicating that the fields correspond to a set of values/items. A field having a set of items/values may be represented by braces ("{" and "}"), indicating that these fields may contain multiple values/items. Upon determining the indicator associated with this field (e.g., braces), the service provider 102 may determine that the field is a set of values/items. As a result, the object merge process 140 may combine the values within this field from both the current object and the modified object, ensure that no duplicate values/items are included in the field of the updated object, and potentially arrange the values/items within the field in an order (e.g., chronological, numerical, alphabetical, etc.). In particular, for a field associated with a set of values/items, the object merge process 140 may determine whether any duplicate values/items are included in both the current object and the modified object. If so, the field in the updated object will only contain non-duplicative values/items within that set field.

Although different types of fields or data within fields may be determined or identified using an indicator (e.g., parentheses, brackets, slices, etc.), it is contemplated that any number, character, symbol, etc. may be utilized to indicate the type of field within an object. In other instances, such as GraphQL, for example, that has strongly-typed data, the data type associated with a field can be determined by the schema definitions associated with a data object. Regardless of the indicator being used to indicate a type of a field (e.g., a scalar value, a list, a set, array, etc.), the object merge process 140 may utilize the indicators to determine whether and how to merge current objects and modified objects. Upon identifying an indicator or identifier associated with a field, the object merge process 140 may determine how to merge two objects even when data within a particular field may potentially constitute a conflict.

As shown in FIG. 6, the current object 602 includes "Kobe" and "Bean" within the "nicknames" field while the modified object 604 includes "Mamba" and "Bean" within the "nicknames" field. Similarly, the current object 602 includes "2000", "2001", and "2002" within the "championyears" field while the modified object 604 includes "2000", "2009", "2002", and "2010" within the "championyears" field. These fields may correspond to binary sets, number sets, or string sets, which list various pieces of information associated with the corresponding field. Since the data within the fields does not conflict and the modified object 602 adds new data to the "nicknames" and "championyears" fields that are not included in the current object 602, the object merge process 140 may merge the two objects. The resulting updated object 606 may then include "Kobe", "Bean", and "Mamba" within the "nicknames" field and include "2000", "2001", "2002", "2009", and "2010" within the "championyears" field. As shown, the data within a field may be arranged in numerical or chronological order, which is represented by the data in the "championyears" field. The data within a field can also be arranged based on the order from the current object 602. That is, since the current object 602 listed "Kobe" and "Bean" within the "nicknames" field and the modified object 604 introduced the nickname "Mamba," "Mamba" may be placed at the end of the "nicknames" field in the updated object 606.

If the current object 602 and the modified object 606 were both modified objects from users 106, the object merge process 140 would perform the same merging as described above. However, due to two separate modifications to the object corresponding to two different users 106 the version number would be incremented by two from "2" to "4".

FIG. 6 is an example of having conflicting versions of an object with a conflicting field ("nicknames" and "championyears"), and conflicting sets of data. As a result of the merging between the current object 602 and the modified object 604, the version counter will increment the version number from "2" to "3" such that the updated object 606 will have a version of "3".

As illustrated in, and described with respect to, FIGS. 2-6, the service provider 102 may detect conflicts between different versions of the same object. The service provider 102 further automatically resolves such conflicts, possibly via an object merge process 140 that merges the different versions of the object to generate an updated object that includes modifications made to the object and that serves as a most current version of the object. For conflicting versions of an object that have non-conflicting fields, the service provider 102 may merge or union the different versions such that the resulting updated object includes each of the fields of both versions of the object. With respect to conflicting versions of an object with conflicting fields, the service provider 102 may reject the modifications included in the object that are different than the current version of the object. The user 106 that submitted the rejected modification may resubmit the modification in the most current version of the object. For conflicting versions of an object that have conflicting lists in the same field, the service provider 102 may merge or union the two lists such that the resulting updated object includes the data identified in the lists of each object. Moreover, for conflicting versions of an object that have conflicting nested maps within the same field, the service provider 102 may merge or union the map entries such that the resulting updated object includes each of the nested maps from both versions of the object. In some embodiments, there may be conflicting versions of an object where one of the versions is to be deleted. Since such an object is specified to be deleted since it is likely a prior version of the object, the service provider 102 may choose the other object as the updated object.

Figure 7:
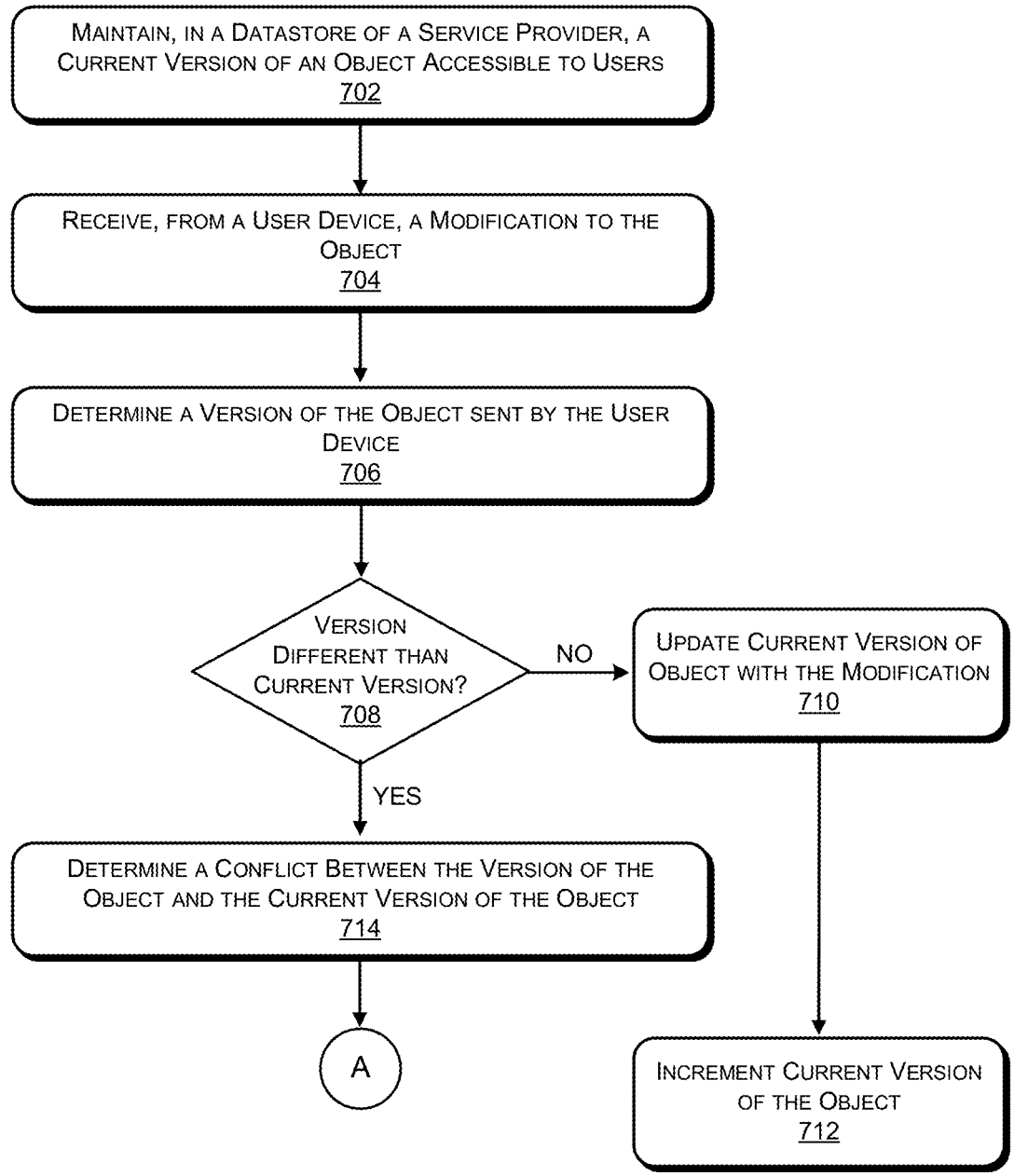
FIG. 7 is a schematic diagram of an illustrative process for determining a conflict between a current version of an object and a modified version of the object.
Figure 8:
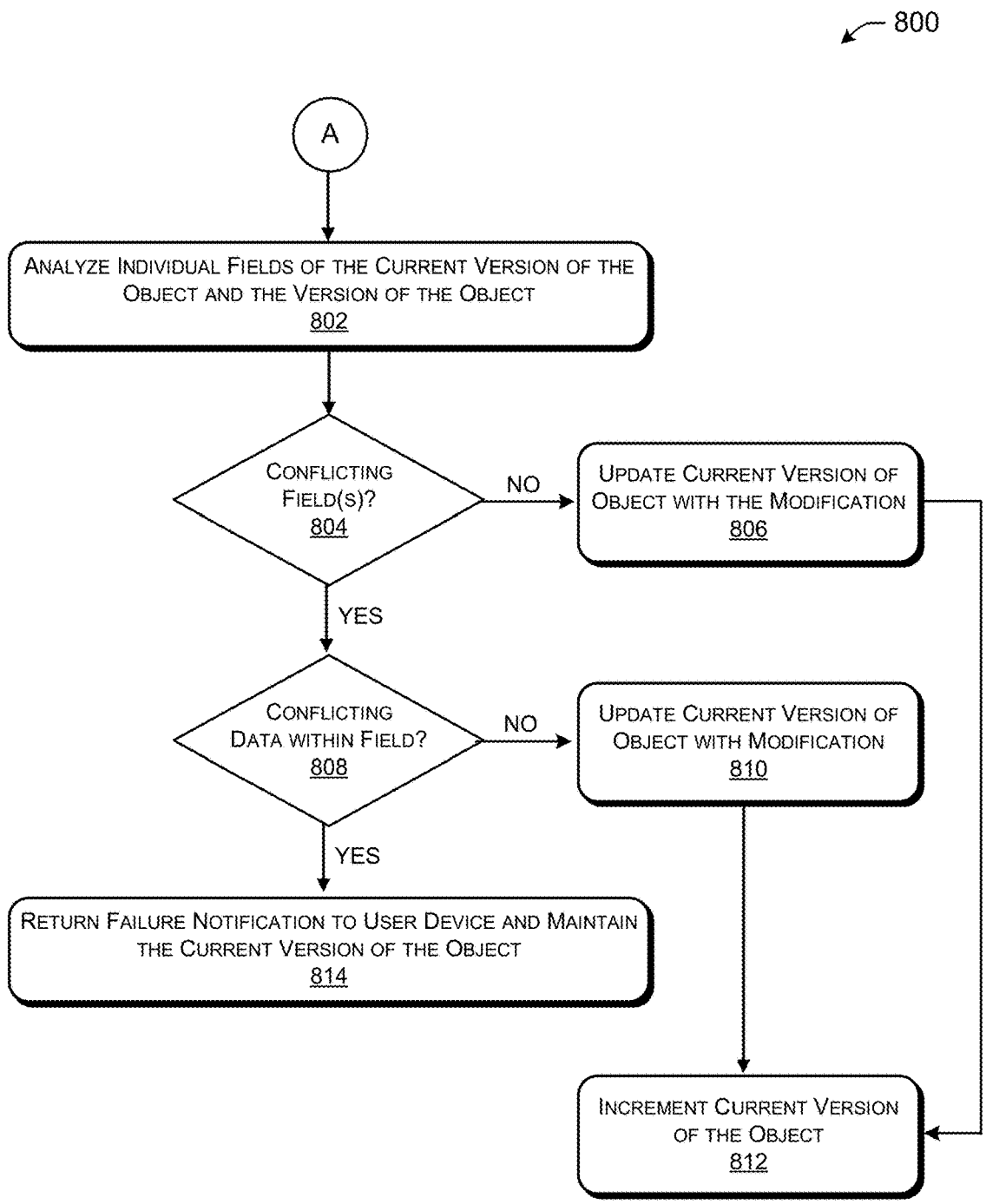
FIG. 8 is a schematic diagram of an illustrative process for resolving a conflict between a current version of an object and a modified version of the object.
Figure 9:
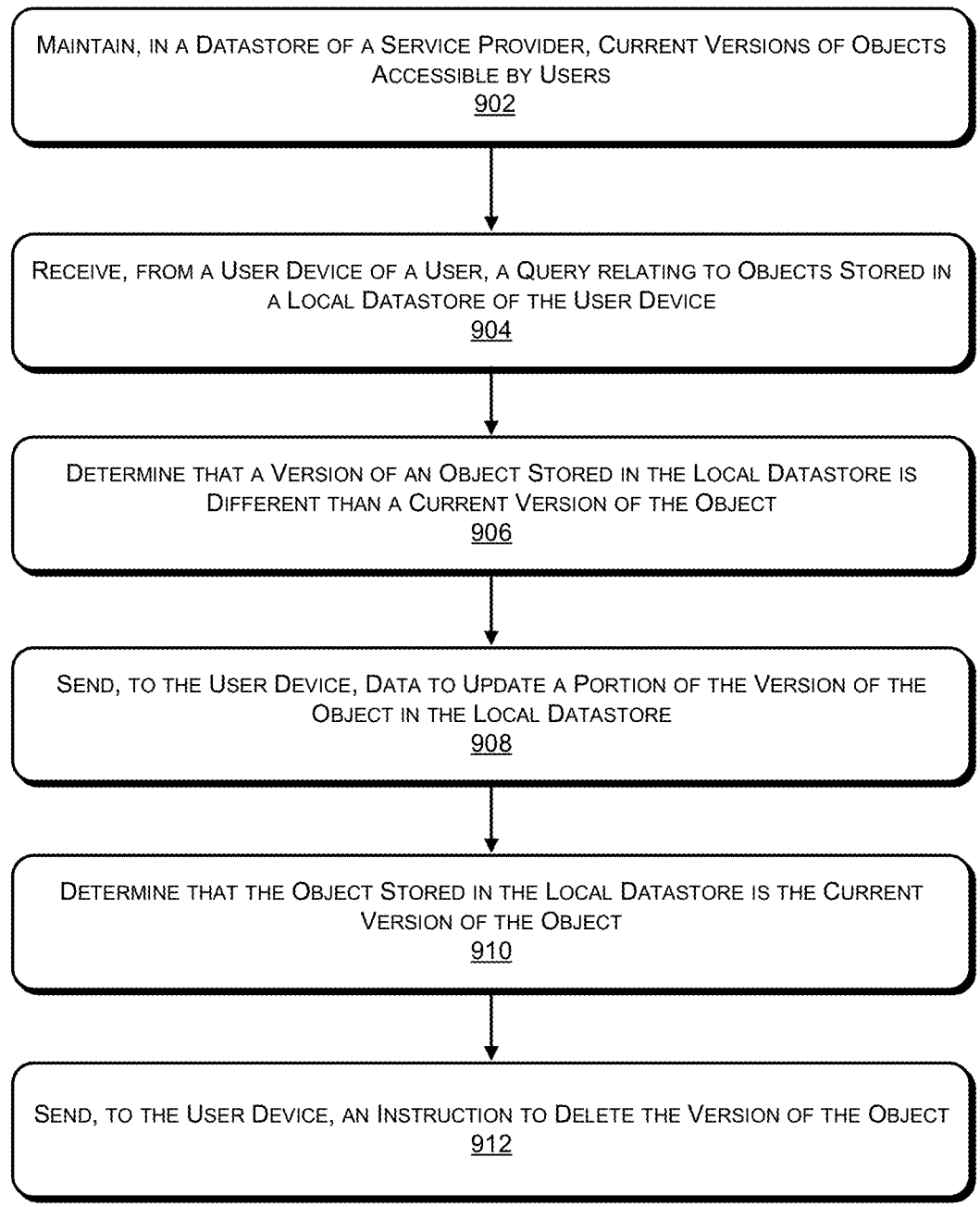
FIG. 9 is a schematic diagram of an illustrative process for synchronizing a local datastore of objects at a user device with a centralized datastore of objects maintained by one or more servers.

FIGS. 7-9 are flow diagrams of illustrative processes illustrated as a collection of blocks in a logical flow graph, which represent a sequence of operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the process. Other processes described throughout this disclosure shall be interpreted accordingly.

FIG. 7 is a flow diagram of an illustrative process 700 to detect a conflict between different versions of a same object. The process 700 is described with reference to the environments and diagrams illustrated in FIGS. 1-6. In particular, the process 700 may occur via or be performed by the service provider 102. Of course, the process 700 may be performed in other similar and/or different environments.

Block 702 illustrates maintaining, in a datastore of a service provider, a current version of an object accessible to users. In various embodiments, the service provider 102 may maintain a datastore or database (e.g., the server datastore 116) of objects (e.g., documents, websites, mobile or web applications, word-processing documents, spreadsheets, etc.) that are created by, and accessible to, users 106. The server datastore 116 may include the most recent version of objects such that users 106 can access updated objects and make modifications thereto.

Block 704 illustrates receiving, from a user device, a modification to the object. In some embodiments, users 106 may make a modification to an object via the server datastore 116, but the user devices 108 of users 106 may also include local datastores 124 that store local versions of object that correspond to the objects stored in the centralized server datastore 116. Accordingly, the user 106 may modify an object from the local datastore 124 and provide the modified object or just the modification to the object to the service provider 102.

Block 706 illustrates determining a version of the object sent by the user device. The local datastore 124 of the user devices 108 may be synchronized with the server datastore 116 when user devices 108 are online and connected to the network(s) 110. If user devices 108 are offline, there is a possibility that a version of an object being accessed or modified by a user 106 is not the most recent version of the object. For instance, while the user 106 is offline, a different user 106 may have modified the object and the modified object may be subsequently maintained by the server datastore 116, where the object modified by the different user 106 will have a modified version to reflect the most recent version of the object.

Block 708 illustrates whether the version is different than the current version. Included with the modified object sent by the user 106 is a version of that object. Upon receiving the modified object, the service provider 102 may determine whether the version of the modified object is different than the current version of the object saved in the centralized server datastore 116. In some embodiments, the version of an object may be identified by a value, number, character, and so on.

Following the "no" arrow from block 708 (e.g., version not different than current version), block 710 illustrates updating the current version of the object with the modification. That is, if the service provider 102 determines that the version of the modified object is the same as the current version of the object maintained in the centralized server datastore 116, then the modification of the object by the user 106 corresponds to the most recent version of the object. As a result, the service provider 102 may merge the modified object with the current object such that the most recent version of the object includes the user modification.

Block 712 illustrates increment the current version of the object. Provided that the current version of the object is modified, the service provider 102 may increment the version number or counter of the object to indicate a new most recent version of the object. For instance, if the version counter for the object stored in the server datastore 116 was "4", the version counter may be incremented by one to "5" to reflect the modification to the object made by the user 106. The extent to which the version counter is incremented may be dependent upon the number of users 106 that modified the object. For instance, if two different users 106 made non-conflicting modifications to the object, the version counter may be incremented by two, such as from "4" to "6". Upon the version counter being incremented, the updated object will be subsequently stored in the centralized server datastore for access and modification by users 106.

However, following the "yes" arrow from block 708 (e.g., version different than current version), block 714 illustrates determining a conflict between the version of the object and the current version of the object. For instance, if the version of the modified object is different than (e.g., less than) the current version of the object, the modified object may be a prior version of the object and may be out of date. Therefore, the service provider 102 may perform operations to resolve the conflict between the modified object received from the user 106 and the current version of the object maintained in the centralized server datastore 116.

FIG. 8 is a flow diagram of an illustrative process 800 to resolve a conflict between different versions of an object. The process 800 is described with reference to the environments and diagrams illustrated in FIGS. 1-6. In particular, the process 800 may occur via or be performed by the service provider 102. Of course, the process 800 may be performed in other similar and/or different environments. As shown, the operations illustrated in FIG. 8 continue from block 714 illustrated in FIG. 7.

Block 802 illustrates analyzing individual fields of the current version of the object and the version of the object. Upon determining that a conflict exists between the modified object and the current version of the object (block 714), the service provider 102 may analyze different fields of the objects to determine if there are any conflicts or inconsistencies. The service provider 102 may identify just the fields that were newly added in the modified object or that include data that was modified or added within an existing field from the current version of the object.

Block 804 illustrates whether there are any conflicting fields. In particular, it may be determined whether any fields of the modified object conflict with corresponding fields of the current version of the object.

Following the "no" arrow from block 804 (e.g., no conflicting fields), block 806 illustrates updating the current version of the object with the modification. Here, the modification made by the user 106 may be associated with a field that does not conflict with the corresponding field in the current version of the object. In embodiments where multiple users 106 are making modifications to the object, the service provider 102 may determine that a first modification to the object made by a first user is associated with a first field and that a second modification to the object made by a second, different user is associated with a second field that is different than the first field. As a result, since the modifications are in different fields of the object, the modifications likely would not conflict.

Following the "yes" arrow from block 804 (e.g., yes, conflicting fields), block 808 illustrates whether there is conflicting data within a field. For instance, even though a modification of the object corresponds to data within a field of the current version of the object, the service provider 102 may determine whether the modification actually conflicts with the data currently included within that field. As part of determining whether there is conflicting data within a field, a data type of each field may be determined and taken into consideration when determining whether there is conflicting data. Examples of this are depicted and discussed in reference to FIGS. 4-6, above.

Following the "no" arrow from block 808 (e.g., no conflicting data within the field), block 810 illustrates updating the current version of the object with the modification. In this scenario, the modification to the field may add data to the field, add items to a list within the field, add a nested structure or map to the field, and so on. Provided that the modification does not conflict with data within this field, the modified object may be merged with the current version of the object, resulting in an updated object that includes the modification.

Block 812 illustrates incrementing the current version of the object. Following block 806 and/or 810 in which the modified object is merged with the current version of the object, the version of the current object may be incremented, which results in an updated version of the object. The updated objected and its corresponding incremented version may be stored in the centralized server datastore 116 for subsequent access and modification by users 106.

However, following the "yes" arrow from block 808 (e.g., yes, conflicting data within the field), block 814 illustrates returning a failure notification to the user device and maintaining the current version of the object. Here, the modification conflicted with data within a field of the current version of the object, so the modified object will not be merged with the current version of the object. For instance, as illustrated in FIGS. 2-6, the current object may have an "age" field that includes the number "23" while the modified object includes a "22" for the "age" field. Since these values are different and conflict, the service provider 102 will refrain from making the modification. The service provider 102 may indicate the failure to write the modification to the object, may provide the most current version of the object to the user 106, and may give the user 106 an opportunity to resubmit the modification to the most current version of the object.

FIG. 9 is a flow diagram of an illustrative process 900 to synchronize a local datastore of a user device with a centralized datastore maintained by a service provider. The process 900 is described with reference to the environments and diagrams illustrated in FIGS. 1-6. In particular, the process 900 may occur via or be performed by the service provider 102. Of course, the process 900 may be performed in other similar and/or different environments.

Block 902 illustrates maintaining, in a datastore of a service provider, current versions of objects accessible by users. In some embodiments, the service provider 102 may maintain a centralized datastore or database (e.g., the server datastore 116) of objects (e.g., documents, websites, mobile or web applications, word-processing documents, spreadsheets, etc.) that are created by, and accessible to, users 106. The server datastore 116 may include the most recent version of objects such that users 106 can access updated objects and make modifications thereto.

As noted herein, a user 106 may utilize the service provider 102 to create, access, modify, update, etc. objects that are maintained in the server datastore 116. Local copies of the object and/or a list of the objects stored in the server datastore 116, along with identified versions of the objects, may also be stored in local datastores 124 maintained by user devices 108 of the users 106. For users 106 that are online, meaning that their user devices 108 are connected to the network(s) 110, the service provider 102 may synchronize the local datastores 124 with the server datastore 116 so that the users 106 have access the most current versions of the objects. However, users 106 that are offline, meaning that their user devices 108 are not connected to the network(s) 110 for at least a period of time, may not receive the most current version of the objects. Updating of the objects and updating of the version numbers/counters of the objects occurs at and by the service provider 102, so the service provider 102 needs to ensure that users 106 have access to the most current version of the objects.

Block 904 illustrates receiving, from a user device of a user, a query relating to objects stored in a local datastore of the user device. When a user device 108 is connected to the network(s) 110 and is online, the user device 108 may send a query to the service provider 102 in order to synchronize it's local datastore 124 with the server datastore 116. In some embodiments, user devices 108 may update their local datastores 124 based on a GraphQL query, where the GraphQL query includes a list of objects from the service provider 102, as well as an identify of the version of those objects. Accordingly, the GraphQL query may serve as a transport mechanism between the service provider 102 and user devices 108 so that the local datastores 124 of the user devices 108 can receive the most current version of the objects stored in the centralized server database 116, or at least a list of such objects along with an identity of the corresponding versions.

Block 906 illustrates determining that a version of an object stored in the local datastore is different than a current version of the object. In some embodiments, when a user device 108 goes offline and comes back online, modifications could have been made to objects and the updated objects may be subsequently saved to the server datastore 116. As a result, a version of objects stored in the local datastore 124 of the user device 108 may not be the same as the current version of objects stored in the server datastore 116. Whenever a write, or a modification, is made to an object in the server datastore 116, the write or modification may occur in at least two locations. First, the write or modification can be applied in the current object table 146 referenced above with respect to FIG. 1. The current object table 146 may maintain the most current versions of objects that are accessible to users 106 via the service provider 102. The write or modification may also be applied to the object variation table 148 referenced above with respect to FIG. 1. The object variation table 146 may correspond to a journal or change log of events with respect to updates or modifications to the objects maintained in the server datastore 116. That is, the object variation table 148, for each object, may identify writes or modifications to the object over time. When a user 106 creates, updates, or deletes objects, the service provider 102 may write such changes to both the current object table 146 and the object variation table 148.

Block 908 illustrates sending, to the user device, data to update a portion of the version of the object in the local datastore. Upon a user device 108 being offline and connecting to the network(s) 110 and coming online, the user device 108 may send a query that includes a flag or indicator that identifies a last time the local datastore 124 of the user device 108 was synchronized with the server datastore 116. Upon receiving this flag/identifier, the service provider 102 may transmit to the user device 108 only the objects that have been updated/modified since the time the local datastore 124 was last synchronized. As a result, the entire list of objects need not be transmitted to the user device 108 and, instead, only a subset of the objects may be provided to the user device 108. The subset of objects that have been modified may be identified from the object variation table 148. In particular, the service provider 102 may execute a query with respect to the object variation table 148, where the query may indicate a time, which may be the last time the local datastore 124 was synchronized. Based on the query, the object variation table 148 may return a list of objects that have been modified or updated since the time specified in the query. Only those objects may then be provided to the user device 108, which may reduce processing time to synchronize the local datastore 124, reduction in latency to update the local datastore, and an increase in network bandwidth since less data is being transmitted across the network(s) 110 to user devices 108. In some embodiments, at various intervals (e.g., every hour, day, week, month, etc.), the service provider 102 may perform a global catch-up process in which the local datastore 124 is synchronized using the current versions of objects identified in the current object table 146, as opposed to only being updated using the modifications identified in the object variation table 148.

Block 910 illustrates determining that the object stored in the local datastore is the current version of the object. That is, using the current object table 146 and/or the object variation table 148, the service provider 102 may provide object updates to the user device 106 that have occurred since the local datastore 124 was last synchronized. Upon synchronizing the local datastore 124 of the user device 108, the service provider 102 may determine that the local datastore 124 includes the most recent versions of the objects maintained in the centralized server datastore 116.

Block 912 illustrates sending, to the user device, an instruction to delete the version of the object. Upon determining that a local datastore 124 of a user device 108 has been updated with the most current version of the object stored in the centralized server datastore 116, a tombstone operation may be performed with respect to the object in the server datastore 116. That is, the object in the server datastore 116 may not be deleted, but will be marked or tagged with a delete operation. Then, the service provider 102 may send an instruction to the user device 108 to delete the prior version of the object so that it is longer stored in the local datastore 124.

Figure 10:
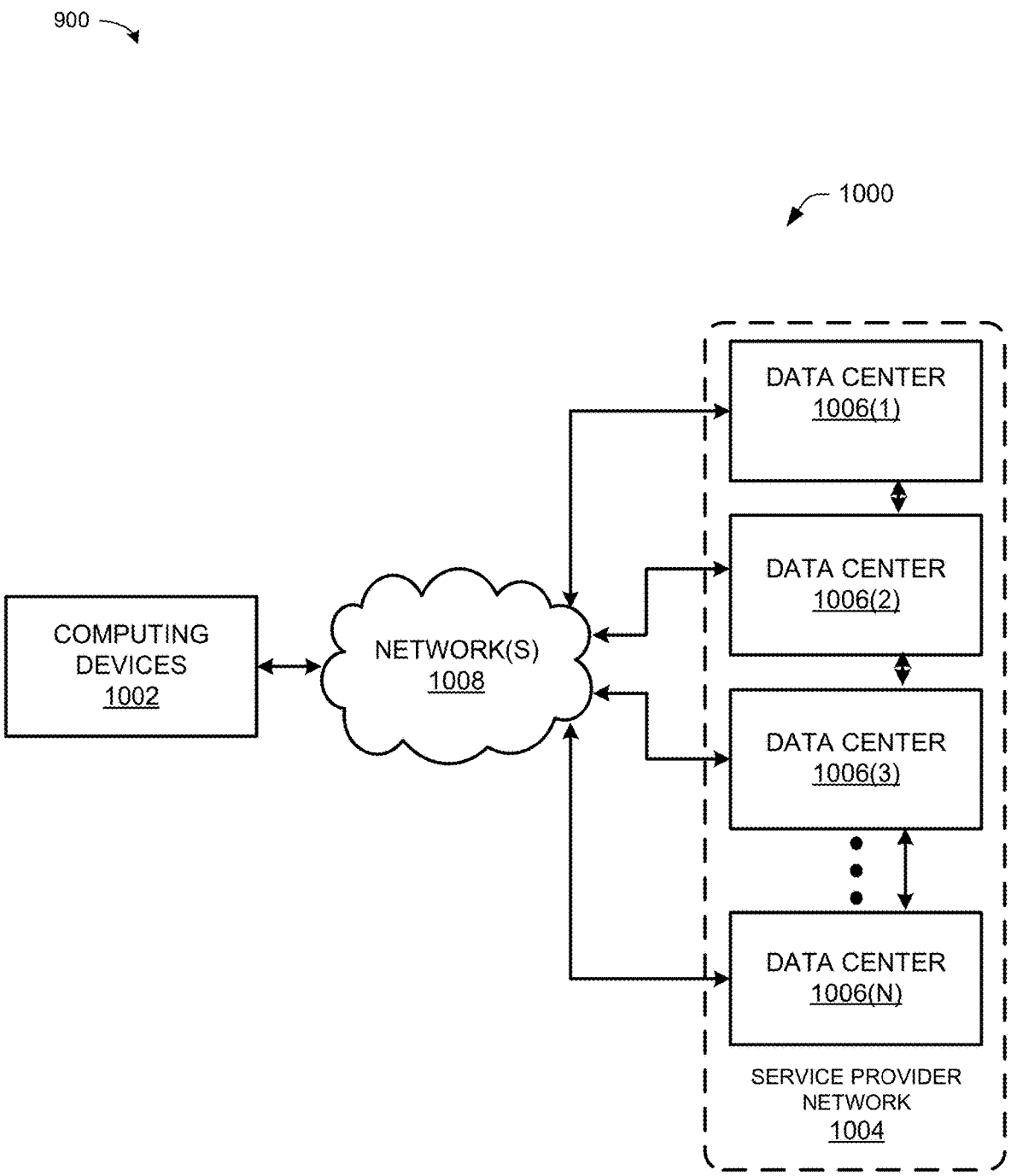
FIG. 10 is a block diagram that shows one illustrative operating environment for the examples disclosed herein that includes a service provider network.

FIG. 10 is a block diagram that shows an illustrative operating environment 900 for the examples disclosed herein that includes a service provider network. FIG. 10 and the following description are intended to provide a brief, general description of a suitable computing environment in which the examples described herein may be implemented. In particular, FIG. 10 is a system and network diagram that shows an illustrative operating environment that includes one or more computing devices 1002 and a service provider network 1004. As discussed above, service provider network 1004 can provide virtual machine instances and computing resources on a permanent or an as-needed basis.

The computing resources provided by the service provider network 1004 may include various types of resources, such as data processing resources, data storage resources, networking resources, data communication resources and the like. Each type of computing resource may be general-purpose or may be available in a number of specific configurations. For example, and as will be described in greater detail below, data processing resources may be available as virtual machine instances in a number of different configurations. The virtual machine instances may be configured to execute applications, including Web servers, application servers, media servers, database servers and other types of applications. Data storage resources may include file storage devices, block storage devices and the like. Each type or configuration of a virtual machine instance of a computing resource may be available in different sizes, such as large resources, consisting of many processors, large amounts of memory, and/or large storage capacity, and small resources consisting of fewer processors, smaller amounts of memory and/or smaller storage capacity.

The computing resources provided by service provider network 1004 are enabled in one implementation by one or more data centers 1006(1)-1006(N) (which may be referred to herein singularly as "a data center 1006" or collectively as "the data centers 1006"). The data centers 1006 are facilities utilized to house and operate computer systems and associated components. The data centers 1006 typically include redundant and backup power, communications, cooling and security systems. The data centers 1006 might also be located in geographically disparate locations. One illustrative configuration for a data center 1006 that implements some or all of the concepts and technologies disclosed herein will be described below with regard to FIG. 11.

The users and customers of service provider network 1004 may access the computing resources provided by the data centers 1006 over a suitable data communications network, such as a Wide Area Network ("WAN"), as illustrated by network(s) 1008. Although a WAN might be used, it should be appreciated that a local-area network ("LAN"), the Internet, or any other networking topology known in the art that connects the data centers 1006 to the computing devices 1002 (such as the user devices 108 illustrated in FIG. 1) may be utilized. It should also be appreciated that combinations of such networks might also be utilized.

Figure 11:
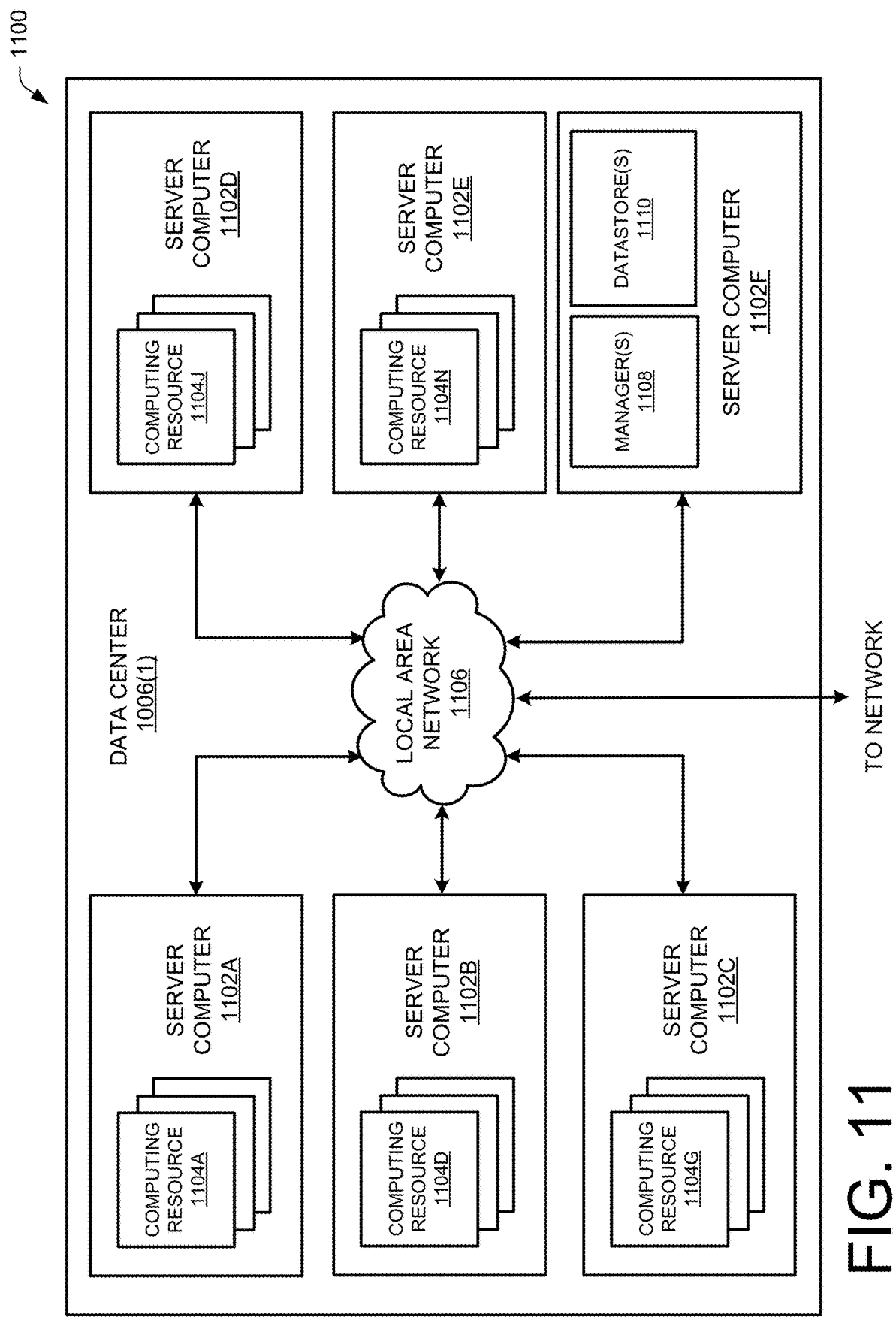
FIG. 11 is a block diagram that illustrates one configuration for a data center that implements aspects of a service provider network, including some or all of the concepts and technologies disclosed herein.

FIG. 11 is a block diagram that illustrates an illustrative architecture 1100 of one configuration for a data center 906 that implements aspects of the service provider network 904, including some or all of the concepts and technologies disclosed herein. The example data center 906(1) shown in FIG. 11 includes several server computers 1102A-1102F (which may be referred to herein singularly as "a server computer 1102" or in the plural as "the server computers 1102") for providing computing resources. The server computers 1102 may be standard tower or rack-mount server computers configured appropriately for providing the computing resources described herein. According to an example, the server computers 1102 are configured to execute the software products as described above.

In an example, some of the computing resources 1104 are virtual machine instances. As known in the art, a virtual machine instance is an instance of a software implementation of a machine (i.e. a computer) that executes programs like a physical machine. Each of the server computers 1102 may be configured to execute an instance manager capable of instantiating and managing computing resources and instances of computing resources. In the case of virtual machine instances, for example, the instance manager might be a hypervisor or another type of program configured to enable the execution of multiple virtual machine instances on a single server computer 1102, for example.

It should be appreciated that although the examples disclosed herein are described primarily in the context of virtual machine instances, other types computing resources can be utilized with the concepts and technologies disclosed herein. For instance, the technologies disclosed herein might be utilized with hardware resources, data storage resources, data communications resources, networking resources, database resources and with other types of computing resources.

The data center 1006(1) shown in FIG. 11 also includes a server computer 1102F reserved for executing software components for managing the operation of the data center 1006(1), the server computers 1102, virtual machine instances, and other resources within the service provider network 1004. The server computer 1102F might also execute one or more managers 1108 and include one or more datastores 1110. In this regard, it should be appreciated that while these components are illustrated as executing within service provider network 904, computing systems that are external to service provider network 904 might also be utilized to execute some or all of these components. Other configurations might also be utilized.

In the example data center 1006(1) shown in FIG. 11, an appropriate local area network ("LAN") 1106 is utilized to interconnect the server computers 1102A-1102E and the server computer 1102F. The LAN 1106 is also connected to the network(s) 1008 illustrated in FIG. 10. It should be appreciated that the configuration and network topology illustrated in FIGS. 10 and 11 has been greatly simplified and that many more computing systems, networks and networking devices may be utilized to interconnect the various computing systems disclosed herein. Appropriate load balancing devices or software modules might also be utilized for balancing a load between each of the data centers 1006(1)-1006(N), between each of the server computers 1102A-1102F in each data center 1006 and between virtual machine instances and other types of computing resources provided by the service provider network 1004.

It should be appreciated that the data center 1006(1) described in FIG. 11 is merely illustrative and that other implementations might also be utilized. Additionally, it should be appreciated that the functionality provided by these components might be implemented in software, hardware, or a combination of software and hardware. Other implementations should be apparent to those skilled in the art.

Although the subject matter presented herein has been described in language specific to computer structural features, methodological acts and computer readable media, it is to be understood that the subject matter defined in the appended claims is not necessarily limited to the specific features, acts, or media described herein. Rather, the specific features, acts and media are disclosed as example forms of implementing the claims. Moreover, the subject matter described above is provided by way of illustration only and should not be construed as limiting.

What is claimed is:

1. A system comprising:
   one or more processors; and
   memory storing computer-implemented instructions that, when executed, cause the one or more processors to perform operations comprising:
   maintaining, in one or more servers of a service provider, a centralized datastore storing a plurality of objects that are accessible to users of the service provider, the centralized datastore identifying current versions of each object of the plurality of objects;
   causing data associated with the plurality of objects to be maintained in local datastores of user devices of the users;
   receiving, by the service provider and from a user device of a user, an indication of a modification to a local version of an object and a version number for the local version of the object;
   detecting, based on the version number being less than a current version number for a current version of the object maintained in the centralized datastore, a conflict between the local version of the object and the current version of the object;
   based on detection of the conflict, at least one of:
   determining that the modification corresponds to a first field that is absent from the current version of the object; or
   determining that the modification corresponds to first data within a second field that does not conflict with second data included in the second field of the current version of the object;
generating an updated version of the object by merging the local version of the object with the current version of the object, wherein the updated version of the object includes at least one of the first field or the first data;
generating an updated version number by incrementing the current version number by one;
associating the updated version number with the updated version of the object, the updated version of the object and the updated version number being stored in the centralized datastore; and
sending, to the user device, a notification indicating that the modification has been written to the object.

2. The system as recited in claim 1, wherein the operations further comprise:
receiving, by the service provider and from the user device of the user, an indication of a second modification to a local version of a second object and a version number for the second object;
determining that the version number is a same as a current version number for a current version of the second object maintained in the centralized datastore; and
generating an updated version of the second object by merging the local version of the second object with the current version of the second object, wherein the updated version of the second object includes the modification.

3. The system as recited in claim 1, wherein the operations further comprise:
receiving, by the service provider and from the user device of the user, an indication of a second modification to a local version of a second object and a version number for the second object;
detecting, based on the version number being less than a current version number for a current version of the second object maintained in the centralized datastore, a second conflict between the local version of the second object and the current version of the second object;
determining, based on detection of the second conflict, that the modification corresponds to third data within a third field that conflicts with fourth data included in the third field of the current version of the second object; and
sending, to the user device, a notification indicating that the modification has been rejected and that the modification can be resubmitted with respect to the current version of the second object.

4. The system as recited in claim 1, wherein the operations further comprise writing the modification to a current object table and an object variation table maintained by the service provider, the current object table identifying the current versions of each object of the plurality of objects and the object variation table identifying modifications to the plurality of objects and a time associated with each of the modifications.

5. The system as recited in claim 4, wherein the operations further comprise:
determining that a local datastore of the user device has not synchronized with the centralized datastore for a period of time beginning at a time;
identifying, from the object variation table, one or more modifications of objects that have occurred since the time; and
sending the one or more modifications to the user device, the one or more modifications to be incorporated within the local datastore.

6. A method comprising:
maintaining, by a service provider, a first version of an object;
receiving, by the service provider and from a user device of a user, a second version of the object;
determining that a first version character of the first version of the object is different than a second version character of the second version of the object;
detecting a conflict between the first version of the object and the second version of the object by at least one of:
determining that a modification associated with the second version of the object corresponds to a first field that is absent from the first version of the object; or
determining that the modification corresponds to first data within a second field that does not conflict with second data included in the second field of the first version of the object;
generating, based at least in part on detecting the conflict, a third version of the object that includes the modification; and
updating the first version character of the first version of the object.

7. The method as recited in claim 6, further comprising:
maintaining, in one or more servers of the service provider, a centralized datastore storing a plurality of objects, including the first version of the object, that are accessible to users, the centralized datastore identifying a version character of each object of the plurality of objects; and
causing data associated with the plurality of objects to be maintained in local datastores of user devices of the users.

8. The method as recited in claim 6, wherein the first version character is a first version counter and the second version character is a second version counter, and wherein updating the first version character of the first version of the object comprises incrementing the first version counter by one.

9. The method as recited in claim 6, wherein updating the first version character of the first version of the object comprises updating the first version character of the first version of the object to a third version character, and further comprising associating the third version character with the third version of the object.

10. The method as recited in claim 9, further comprising storing the third version of the object and the third version character in a centralized datastore associated with the service provider.

11. The method as recited in claim 6, further comprising sending, to the user device, a notification indicating that the modification has been written to the object.

12. The method as recited in claim 6, further comprising writing the modification to a current object table and an object variation table associated with the service provider, the current object table identifying current versions of a plurality of objects and the object variation table identifying modifications to the plurality of objects and a time associated with each of the modifications.

13. The method as recited in claim 12, further comprising:
determining that a local datastore of the user device has not synchronized with a centralized datastore associated with the service provider for a period of time beginning at a time;

identifying, from the object variation table, one or more modifications of objects that have occurred since the time; and sending the one or more modifications to the user device, the one or more modifications to be incorporated within the local datastore.

14. The method as recited in claim 6, further comprising:

maintaining, by the service provider, a first version of a second object;

receiving, by the service provider and from the user device or a second user device of a second user, a second version of the second object;

determining that a first version character of the first version of the second object is a same as a second version character of the second version of the second object;

generating a third version of the second object by merging the first version of the second object and the second version of the second object; and updating the first version character of the first version of the second object.

15. A method comprising:

maintaining, by a service provider, a first version of an object;

receiving, by the service provider and from a user device of a user, a second version of the object;

determining that a first version character of the first version of the object is different than a second version character of the second version of the object;

determining that a modification associated with the second version of the object corresponds to first data within a field of the second version of the object that conflicts with second data included in the field of the first version of the object;

determining, based at least in part on an indicator associated with the field, a type of the field; and based at least in part on the modification and the type of the field, refraining from updating the first version of the object to include the modification.

16. The method as recited in claim 15, further comprising sending, to the user device, a notification indicating that modification has been rejected and that the user can resubmit the modification to the first version of the object.

17. The method as recited in claim 15, wherein the first version of the object and a plurality of other objects are maintained in a centralized datastore that is maintained by the service provider and that is accessible to users, the centralized datastore further storing current version characters associated with each object maintained in the centralized datastore.

18. The method as recited in claim 15, further comprising:

receiving, by the service provider and from the user device, a third version of the object;

determining that the first version character of the first version of the object is a same as a third version character of the third version of the object;

generating a fourth version of the object that includes a second modification associated with the third version of the object; and updating the first version character of the first version of the object.

19. The method as recited in claim 18, wherein the first version character of the first version of the object is a first version counter, and wherein updating the first version character of the of the first version of the object comprises incrementing the first version counter by one to generate a second version counter of the fourth version of the object, and further comprising storing the fourth version of the object and the second version counter of the fourth version of the object within a centralized datastore maintained by the service provider.

20. The method as recited in claim 15, further comprising maintaining the first version of the object in a centralized datastore maintained by the service provider.

* * * * *